United States Patent
Entezarian et al.

(10) Patent No.: US 8,016,586 B2
(45) Date of Patent: Sep. 13, 2011

(54) METHODS, TOOLS, AND PRODUCTS FOR MOLDED ORDERED POROUS STRUCTURES

(75) Inventors: Majid Entezarian, Hudson, WI (US);
Richard Smasal, Afton, MN (US);
Justin C. Peskar, Inver Grove Heights, MN (US)

(73) Assignee: Phillips Plastics Corporation, Phillips, WI (US)

( * ) Notice: Subject to any disclaimer, the term of this patent is extended or adjusted under 35 U.S.C. 154(b) by 0 days.

(21) Appl. No.: 12/900,211

(22) Filed: Oct. 7, 2010

(65) Prior Publication Data
US 2011/0024350 A1     Feb. 3, 2011

Related U.S. Application Data

(62) Division of application No. 11/848,163, filed on Aug. 30, 2007, now Pat. No. 7,832,459.

(51) Int. Cl.
*B29C 33/76* (2006.01)
*B29C 31/04* (2006.01)

(52) U.S. Cl. .......... 425/468; 425/577; 249/64; 249/122; 249/145; 249/176

(58) Field of Classification Search .............. 249/63, 249/64, 67, 96, 97, 120, 122, 125, 142, 147, 249/145, 175–177; 425/577, 466–468, DIG. 10; 264/299, 154, 156, 328.1; 164/98, 108, 110, 164/112, 332–334, 340, 346, 368–370
See application file for complete search history.

(56) References Cited

U.S. PATENT DOCUMENTS

| | | | | |
|---|---|---|---|---|
| 2,364,036 A | * | 11/1944 | Mackay et al. | 264/299 |
| 2,369,067 A | * | 2/1945 | Mayer | 164/354 |
| 3,316,595 A | * | 5/1967 | Kordiak Stephen M | 425/470 |
| 4,062,524 A | | 12/1977 | Brauner et al. | |
| 4,218,038 A | * | 8/1980 | Garneau, Sr. | 249/160 |
| 4,220,416 A | | 9/1980 | Brauner et al. | |
| 4,552,716 A | * | 11/1985 | Habich | 264/328.1 |
| 5,114,657 A | * | 5/1992 | Miyajima | 264/334 |
| 5,151,277 A | * | 9/1992 | Bernardon et al. | 425/112 |

(Continued)

FOREIGN PATENT DOCUMENTS

CH       680 973 A5     12/1992

(Continued)

OTHER PUBLICATIONS

International Search Report and Written Opinion of PCT/US2008/010218, mailing date Nov. 20, 2008.

*Primary Examiner* — Joseph S Del Sole
*Assistant Examiner* — Dimple Bodawala
(74) *Attorney, Agent, or Firm* — Foley & Lardner LLP

(57) ABSTRACT

A mold for use in forming form a porous molded product via an injection molding process is provided. The method comprises injecting a material into the mold comprising multiple layers of shaping elements extending through a cavity, each layer of shaping elements including multiple shaping elements; and removing the molded product from the mold, the molded product having a porous structure formed by at least some of the shaping elements of the layers of shaping elements. The porous structure includes a multiplicity of ordered structural members defining the porous structure, the multiplicity of structural members intersecting to form structural member intersections, and a multiplicity of the pores defined by the multiplicity of structural members.

21 Claims, 18 Drawing Sheets

U.S. PATENT DOCUMENTS

| | | | |
|---|---|---|---|
| 5,378,063 A | 1/1995 | Tsukada | |
| 5,435,061 A | 7/1995 | Lantz | |
| 5,522,661 A | 6/1996 | Tsukada | |
| 5,780,079 A | 7/1998 | Lee | |
| 5,891,487 A | 4/1999 | Parise | |
| 5,897,889 A * | 4/1999 | Shao | 425/577 |
| 6,379,143 B1 * | 4/2002 | Kotaki | 425/542 |
| 6,740,281 B2 | 5/2004 | Pinyayev et al. | |
| 6,793,192 B2 * | 9/2004 | Verbrugge | 249/64 |
| 7,300,268 B2 * | 11/2007 | Dooley et al. | 425/4 R |
| 7,419,626 B2 * | 9/2008 | Mark | 264/243 |
| 7,832,459 B2 * | 11/2010 | Entezarian et al. | 164/108 |
| 2003/0160362 A1 * | 8/2003 | Fithian | 264/328.12 |
| 2003/0165080 A1 | 9/2003 | Pinyayev et al. | |
| 2007/0054003 A1 * | 3/2007 | Reis et al. | 425/11 |
| 2007/0126138 A1 * | 6/2007 | Dooley et al. | 264/46.4 |
| 2008/0048356 A1 * | 2/2008 | Kitayama et al. | 264/209.8 |
| 2010/0201018 A1 * | 8/2010 | Yoshioka et al. | 264/101 |

FOREIGN PATENT DOCUMENTS

| | | |
|---|---|---|
| GB | 2 303 817 A | 3/1997 |

\* cited by examiner

Fig. 2D
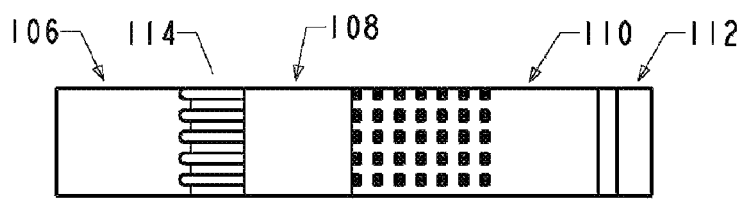
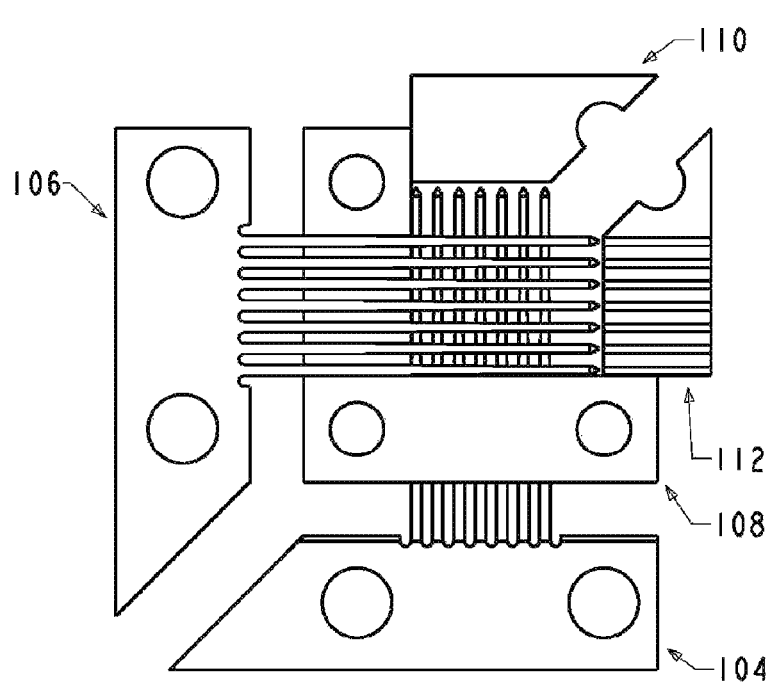
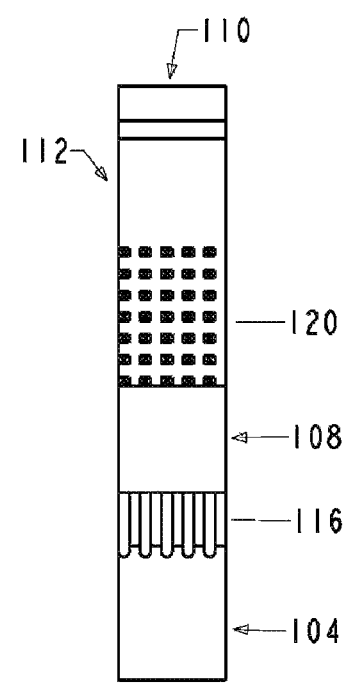
Fig. 2B
Fig. 2C

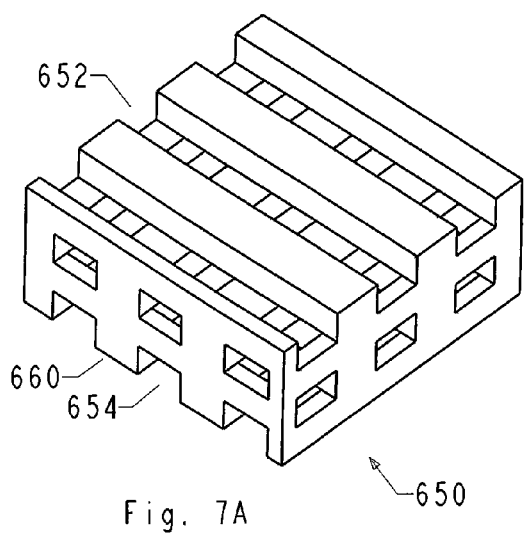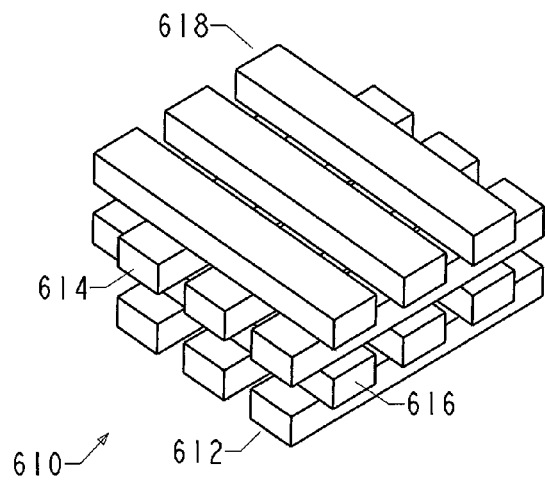
Fig. 7A
Fig. 7B

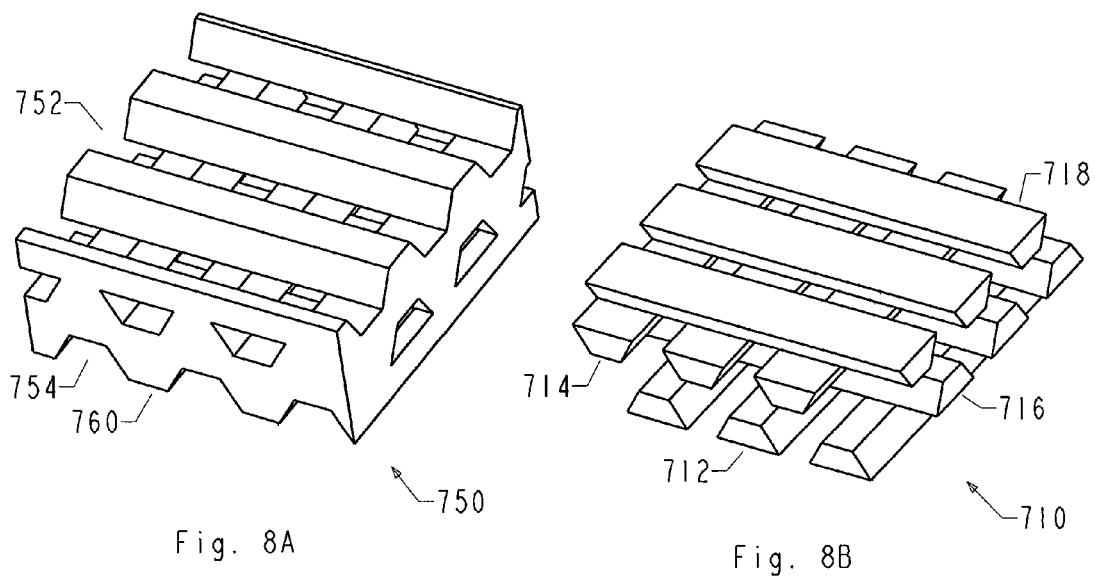

METHODS, TOOLS, AND PRODUCTS FOR MOLDED ORDERED POROUS STRUCTURES

CROSS-REFERENCE TO RELATED PATENT APPLICATIONS

This patent application is a DIV of and claims priority to U.S. patent application Ser. No. 11/848,163, filed on Aug. 30, 2007, now U.S. Pat. No. 7,832,459; the entire contents of which are hereby incorporated by reference herein, for any and all purposes.

BACKGROUND

One-dimensional pore structures are produced through extrusion. The product is usually called the honeycomb structures under the category of cellular structures.

Two-dimensional pore structures are also produced for heat transfer applications though various methods.

The three-dimensional structures are made through three dominant methods. These are foaming, foam replication, and solid free forming or 3D printing processes.

The foaming or replication process is limited to producing non-uniform pore structures. The geometry of the pores is dictated by the formation, growth, and impingement of gaseous cells. In general, pores are spherical in shape. In addition, the openings are not uniform and the variation in pore size could be an order of magnitude.

The 3D printing process or solid free forming produces three-dimensional porous structures by depositing materials using one or several nozzles at once. This process builds the desired structure layer by layer; it is time consuming, limited to few materials, and costly.

BRIEF DESCRIPTION OF THE DRAWINGS

FIGS. 2A-D contain multiple views of a mold for forming a molded ordered porous structure where the mold is only partly assembled;

FIGS. 7A-14B illustrate various pin arrangements of the pins of the mold of FIG. 2 and the molded ordered porous structures made from molds containing that pin arrangement;

DETAILED DESCRIPTION OF EXEMPLARY EMBODIMENTS

Figure 1:
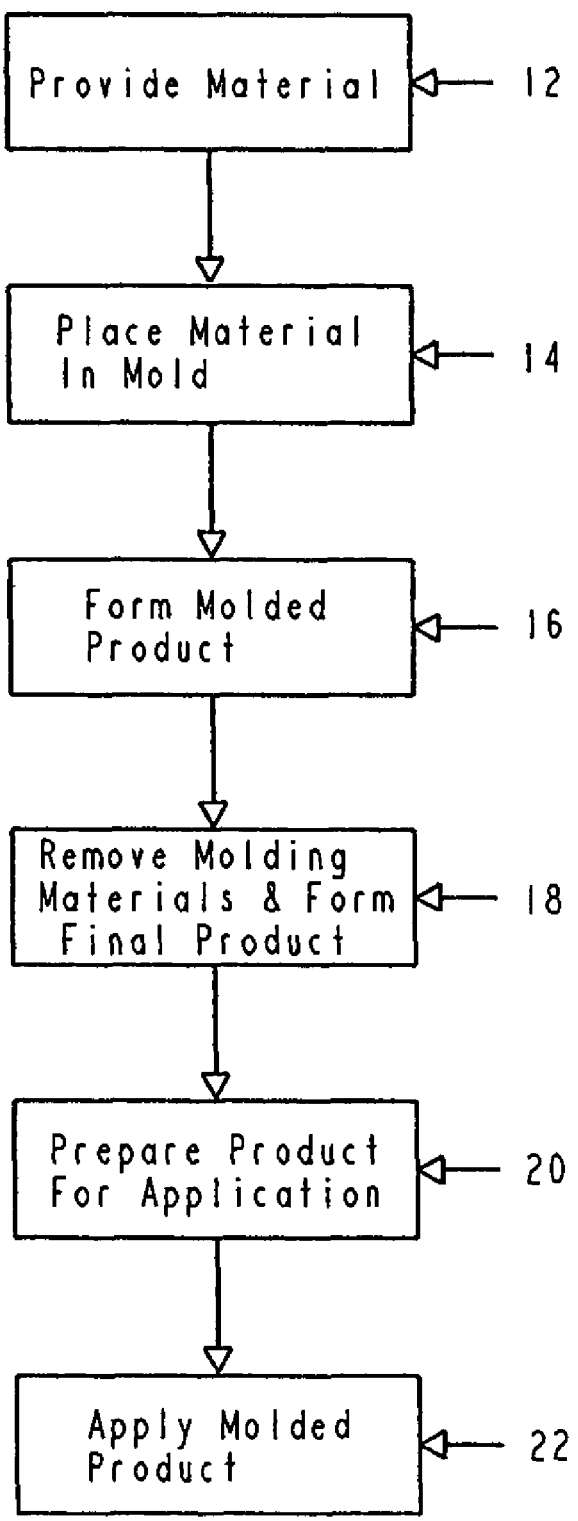
FIG. 1 relates to a method for forming and applying a molded ordered porous structure.

Referring to FIG. 1, a method of forming an article includes providing a material at block 12. The material can be any material usable in a mold. In some embodiments, the material includes one or more of a thermoplastic polymer, a thermoset resin, a ceramic, and a metal such as metal, ceramic, and polymer matrix composites.

In some embodiments, the material can include (at least partially, more than half, substantially, or essentially) a biocompatible material such as a bioresorbable material or a bio-inert material. In some of these embodiments, the material is a bioresorbable material such as a bioresorbable polymer or a bioresorbable ceramic. Examples of bioresorbable ceramics which may be used include tricalcium phosphates, hydroxyapatite, bioactive glass, etc. Examples of bioresorbable polymers include DLPLA-poly(dl-lactide), LPLA-poly(l-lactide), PGA-polyglycolide, PDO-poly(dioxanone), PGA-TMC-poly(glycolide-co-trimethylene carbonate), PGA-LPLA-poly(l-lactide-co-glycolide), PGA-DLPLA-poly(dl-lactide-co-glycolide), LPLA-DLPLA-poly(l-lactide-co-dl-lactide), PDO-PGA-TMC-poly(glycolide-co-trimethylene carbonate-co-dioxanone), PDS, PHV-polyhydroxybutyrate, PHV-polyhydroxyvalerate, PHB-polyhydroxybutyrate, polymers comprising the units, polyester polymers (e.g. polyorthoesters), polymers of naturally occurring esters and/or acids, polyanhydrides, polymers containing peptide (amide) linkages, any combination of these materials, copolymers of any of the monomers of the materials described above, substances selected from a group containing one or more of these materials, etc. In some of these embodiments, the material is a bio-inert material such as bio-inert polymer or bio-inert ceramic. Examples of bio-inert ceramics that can be used include compounds including alumina, ziconia, titania, bio-ceramic materials, etc. Examples of bio-inert polymers include, polyetheretherketone (PEEK), polycarbonate, polyethylene, PMMA, etc.

In some embodiments, the material can be a heat conducting material such as a metal-based material, a diamond-containing material, a polymer material, or some other heat conducting material. As one example, the material may be a stainless steel material. As another example, the material may be an alloy such as an alloy made from cobalt and/or chromium.

Once the material is provided at block 12, it is introduced into the mold at block 14. Introducing the material to the mold could include any number of mold-based forming processes such as injection molding, gravity casting, investment casting, silicone casting, die casting, slip casting, chemical and vapor deposition methods, dip coating, etc. The material may be heated or placed into solution in order to allow the material to be introduced into the mold, and/or any other standard technique may be used.

The product is then formed at block 16. With some materials and/or processes, the final product is formed at block 16. With other materials a non-final product (e.g. a green product) is formed at block 16. Forming the product at block 16 preferably involves using a mold according to any of the embodiments described herein. The product formed at block 16 may be a molded ordered porous structure (MOPS); a structure containing a pre-defined highly porous shape formed by a molding process using a mold containing the inverse of that highly porous shape.

The formed structure at block 16 may have a porosity (% of volume occupied by pores/spaces) of at least about 20%, at least about 25%, at least about 30%, at least about 35%, at least about 40%, at least about 45%, at least about 50%, at least about 55%, at least about 60%, at least about 65%, and/or at least about 70%.

One, some, substantially all, or essentially all of the pores formed in the structure may have a cross-sectional area of at least about 2500 square micrometers, at least about 0.01 square millimeters, at least about 0.1 square millimeters, at least about 0.2 square millimeters, at least about 1 square millimeter, up to about 1 square centimeter, up to about 1 square millimeter, up to about 0.5 square millimeters, up to about 0.3 square millimeters, up to about 0.2 square millimeter, and/or up to about 0.1 square millimeter. In some embodiments, the cross-sectional area may be less than 2500 square micrometers or greater than 1 square centimeter.

One, some, substantially all, or essentially all of the pores formed in the structure may have a cross-sectional diameter (i.e. the average length between internal sides of a pore measured from a two-dimensional cross-section of the pore, the cross-section being perpendicular to the direction in which the pore extends) of up to about 7 mm, up to about 4 mm, up to about 3 mm, up to about 2 mm, up to about 1500 microns, up to about 800 microns, up to about 400 microns, up to about 200 microns, up to about 150 microns, up to about 125 microns, up to about 100 microns, up to about 80 microns, up to about 50 microns, at least about 20 microns, at least about 50 microns, at least about 100 microns, at least about 150 microns, at least about 200 microns, at least about 300 microns, at least about 400 microns, at least about 600 microns, at least about 1 mm, and/or at least about 2 mm. Where a pore does not have a uniform diameter, the average cross-sectional diameter can be measured by picking a point in the center of the pore and measuring (and averaging) the length of a line extending between internal sides of the pore at every 5 degrees (i.e. rotating the lines by 5 degrees for every measurement).

Pores in the molded structure may be designed to be uniform or roughly uniform. In some embodiments at least 70% or at least 80% or at least 90% of the pores that are larger than the average pore size of the structure have a cross-sectional area that is less than 10 times or less than 5 times or less than 2 times the average pore size of the structure. In some embodiments at least 70% or at least 80% or at least 90% of the pores that are smaller than the average pore size of the structure have a cross-sectional area that is more than one-tenth of or more than one-fifth of or more than one-half of the average pore size of the structure.

Pores in the structure may take many forms. In some embodiments, one or more pores may include straight portions (e.g. straight portions that extend under multiple strut members such that a theoretical ray of light could be shone from the start of the pore to the end of the pore without changing direction). The straight portions may be internal, or may be arranged such that a pore extends essentially or substantially straight from one surface of the structure to another structure of the surface. The structure may include several such straight pores, and may include straight pores that extend in more than one direction. In some embodiments, a structure may have at least six primary surfaces. Straight pores may extend from a first primary surface to a second primary surface, and from a third primary surface to a fourth primary surface, but not from a fifth primary surface to a sixth primary surface.

In some embodiments, one or more pores may include portions that extend in a natural direction (e.g. following a straight line, following a curve around a single axis such as a normal curve or an exponential curve, or any other direction that does not require a ray of light following the path of the pore to zig-zag or make other abrupt changes in direction). The straight portions may be internal, or may be arranged such that a pore extends essentially or substantially straight from one surface of the structure to another structure of the surface. The structure may include several such straight pores, and may include straight pores that extend in more than one direction. In some embodiments, a structure may have at least six primary surfaces. Straight pores may extend from a first primary surface to a second primary surface, and from a third primary surface to a fourth primary surface, but not from a fifth primary surface to a sixth primary surface.

Any pore may be internal, or may be arranged such that a pore extends essentially or substantially from one surface of the structure to another structure of the surface. The structure may include several such pores, and may include pores that extend in more than one direction.

The molded structure may be entirely a molded ordered porous structure, or may contain a portion (e.g. a surface portion) that contains the molded ordered porous structure. Such a portion shall be referred to as a molded ordered porous structure herein.

As discussed in more detail below, the pores from the molded ordered porous structure may be substantially entirely interconnected throughout the molded ordered porous structure.

The structure formed at block 16 may include any of the features discussed in more detail, below.

Forming the structure may also include removing the structure from the mold. Removing the structure from the mold may include removing the pins from the molded structure (e.g. by pulling the pins out of the structure), removing a cast that takes the shape of the molded article, melting the material that defined the spaces of the structure (e.g. wax-based pins), etc.

In some embodiments, the process for forming may be provided automatically (e.g. without user intervention). Such a process may provide at least 20 structures per hour per mold, such as 20 structures per hour per mold cavity. In some of these embodiments at least 30, at least 40, at least 50, and/or at least 60 structures are provided per mold and/or per mold cavity per hour. In some embodiments, a multi-cavity mold (e.g. a mold having at least about 5, at least about 10, at least about 15, at least about 20, at least about 25, and/or at least about 30 cavities per mold) is used such that at least about 300, at least about 400, at least about 500, at least about 600, at least about 700, at least about 800, at least about 900, at least about 1000, at least about 1250, at least about 1500, and/or at least about 1750 structures are produced per mold per hour.

A forming process may include a multi-step forming process. For example, a first material may be used to form a structure having a first geometry. A second step may include that structure in a second forming process that uses a different material, and/or a different geometry, and results in a second structure that at least partially includes the first structure. The second step could comprise filling the pores in the first structure with a second material having a different composition than the material used to make the first structure. Further, the first structure could be used as a sacrificial structure (e.g. removed to form the final product) used to form the second structure.

Forming the structure may include foaming some, all, or at least a part of the structural members (e.g. struts) (e.g. the structural members which define the pores). Foaming the structure may be configured to reduce the modulus of the structure and/or increase the flexibility of the structure. Foaming the structure may include co-injection of a gas (argon, nitrogen, oxygen, etc.), incorporation of foaming agents (e.g. sodium bicarbonate, water, etc.), or some other foaming process.

If a product requires further finishing steps, such steps are performed at block 18. Finishing steps may include degating, debinding the product, sintering the product, curing the product, some other heat treatment of the product, etc.

Figure 15B:
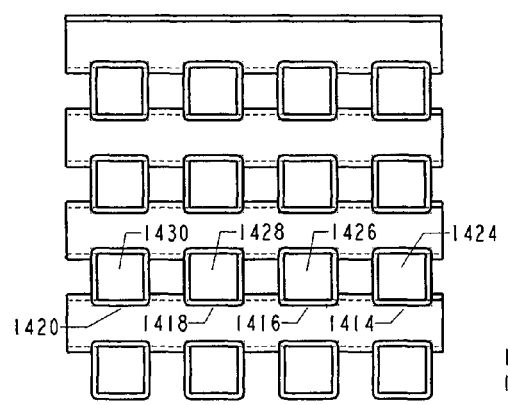
FIGS. 15A&B are an illustration of a molded ordered porous structure having hollow centers which replicates the pattern of the pins in the mold.
Figure 15A:
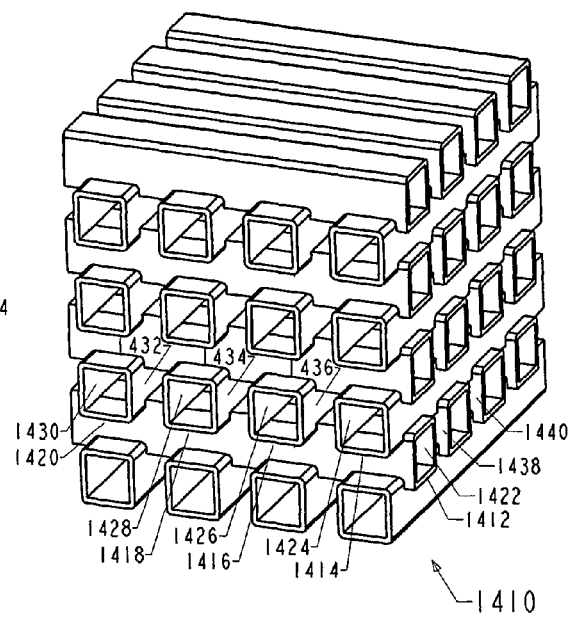

A product may be formed by completely (or substantially completely) filling the spaces in the mold with material, could be formed by coating the pins with a material (e.g. such that a structure replicating the pins is formed and having hollow centers—see FIGS. 15A&B), etc. Any coating technique discussed below could be used.

Once a finished product is formed at block 18, it is prepared for application at block 20. Preparing the product for application may include further shaping of the product, applying coatings (e.g. heat conducting coatings, bio-active coatings, biocidal, ion-exchange coatings, surface area increasing coatings, catalyst coatings, chemically active functional coatings, etc.), etching, leaching, electro plating, etc. Coatings can be applied by dip coating, wash coating, electroplating, slip coating, using a PVD process, using a chemical deposition process, using a solvent process, and/or using other coating processes. Any or any combination of the preparing steps (including any or any combination of the coatings described herein) are contemplated to be applied, in various embodiments of the applications, to any of the applications described herein.

Once the product is prepared at block 20, the product can be applied to its application at block 22. Examples of applications to which the product can be applied include use in a biological application (e.g. a scaffolding for cell growth such as stem cell growth, a whole or portion of an implant such as a bone replacement implant or a dental implant, etc.), a catalytic converter, a heat sink, an ion-exchange column, a catalyst support, in a packed bed reactor, as a filter of a filtration application, as a radiant heater, as a movable material in a kiln, in an absorption application such as a desiccant, etc.

Referring to FIGS. 2A to 2D, a mold 102 for use in an injection molding process includes a first pin carrying body 104 configured to carry multiple pins 116. Pins 116 extend through spaces (e.g. holes, slots, etc.) in spacer body 108. Pins 116 then extend through a space 140 defined in part by body 108. Mold 102 is configured such that, in use, pins 116 then extend through spaces (e.g. holes, slots, etc.) in an end spacer body 110 (see, e.g., FIG. 3). Bodies 108 and 110 may be configured to maintain pins in an ordered relationship (e.g. by allowing pins 116 to resist deforming forces caused by an injection of material into mold 102).

Mold 102 also includes a second pin carrying body 106 configured to carry multiple pins 114. Pins 114 extend through a second set of spaces in spacer body 108, and then extend through space 140. Mold 102 is configured such that pins 114 extend through spaces 120 in an end spacer body 112. Bodies 108 and 112 may be configured to maintain pins in an ordered relationship (e.g. by allowing pins 114 to resist deforming forces caused by an injection of material into mold 102).

Layers of pins 114 can be interlaced with layers of pins 116. For example, as shown, a layer of pins 114 may be spaced between each of the multiple layers of pins 116. In many embodiments, pins 114 contact pins 116 such that pins 114 and pins 116 form a series of interconnected spaces in a product molded using mold 102 (see, e.g., product 650 in FIG. 7A). A pin 206 (FIG. 4A) may contact multiple pins 116, including pins 116 that are horizontally displaced from each other (e.g. pins in a common layer) and pins that are vertically displaced from each other (e.g. pins from different layers). A point of contact for a pin is a spot where one pin contacts another pin. A single pin may have multiple points of contact where that pin contacts multiple pins, separately contacts a single pin multiple times, etc. In some embodiments, the pins within the mold contain at least 100 points of contact and/or at least about 200 points of contact. In some of these embodiments, the pins within a mold have at least about 300 points of contact and/or at least about 400 points of contact. The spaces may be formed in a small reticulated structure. In some embodiments, the pins within the mold have at least any of the above listed number of points of contact within an area having a volume of up to about 400 cubic millimeters, up to about 300 cubic millimeters, up to about 200 cubic millimeters, up to about 100 cubic millimeters, up to about 75 cubic millimeters, up to about 50 cubic millimeters, up to about 25 cubic millimeters and/or up to about 10 cubic millimeters. As an example, in the embodiment illustrated, many of the pins 114 contact fourteen of pins 116, thus each of those pins 114 represents 14 points of contact. If there are twenty-eight pins 114 that each have fourteen points of contact, then the total number of points of contact for those twenty-eight pins is 392.

This structure may generally also form points of contact for the spaces between the pins (e.g. which may be filled with a material to form a structural member of a product formed using the mold). A point of contact for a space between the pin is a spot where one space extending in one direction contacts another space extending in another direction (e.g. in the case of struts and other structural members in a product formed by the mold, it is the location where one structural member contacts another structural member). A single space may have multiple points of contact where that space contacts multiple other spaces, separately contacts a single other space multiple times, etc. In some embodiments, the spaces within the mold (or structural members within a product) contain at least 50 points of contact, at least 100 points of contact and/or at least about 150 points of contact. In some of these embodiments, the spaces within a mold (or structural members within a product) have at least about 200 points of contact, at least about 250 points of contact, at least about 300 points of contact, at least about 350 points of contact, and/or at least about 400 points of contact. The spaces may be formed in a small reticulated structure. In some embodiments, there are at least any of the above listed number of points of contact within an area having a volume of up to about 400 cubic millimeters, up to about 300 cubic millimeters, up to about 200 cubic millimeters, up to about 100 cubic millimeters, up to about 75 cubic millimeters, up to about 50 cubic millimeters, up to about 25 cubic millimeters and/or up to about 10 cubic millimeters.

The pins in the mold may come from any direction, and may cross and/or intersect at any angle. In some embodiments, at least some of the pins 114 and 116 in the mold are configured to cross other pins 116 and 114 in a space (e.g. space 140) of the mold at an angle (i.e. the smaller angle generated by the crossing) of at least about 15 degrees, at least about 30 degrees, up to about 75 degrees, and/or up to about 60 degrees with respect to at least some of the other pins 116 and 114 of the mold. In some of these embodiments, the pins are configured to cross at an angle of at least about 45 degrees, at least about 60 degrees, and/or at least about 75 degrees. In some embodiments (e.g. the illustrated example), at least some of the pins of the mold may be configured to cross the mold at a substantially 90 degree angle to each other. As illustrated, pins 116 are configured to intersect (cross and contact each other) at least some of the pins 114 at a roughly 90 degree angle. Some of the pins of the mold may be configured to intersect other pins of the mold at any of the angles discussed above. Further, some pins may cross each other at one angle, while others of the pins may cross at different angles.

Figure 2A:
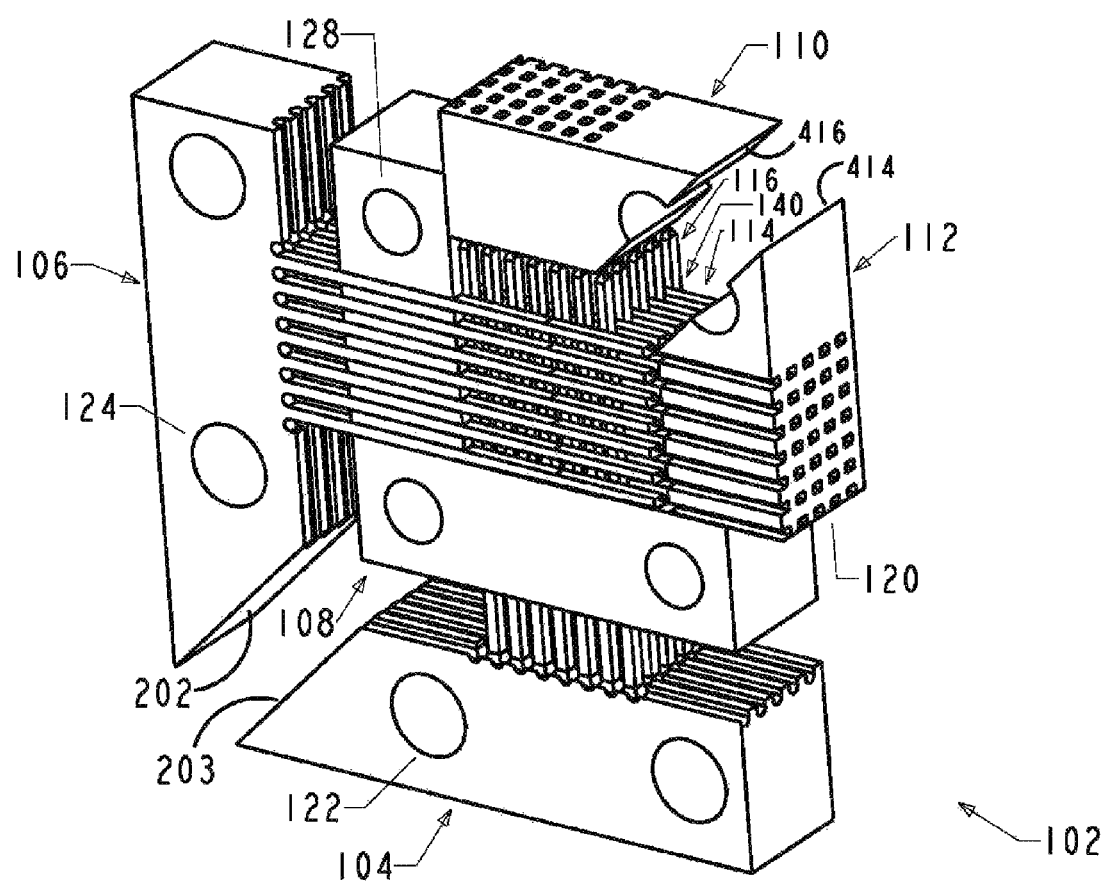
Figure 3:
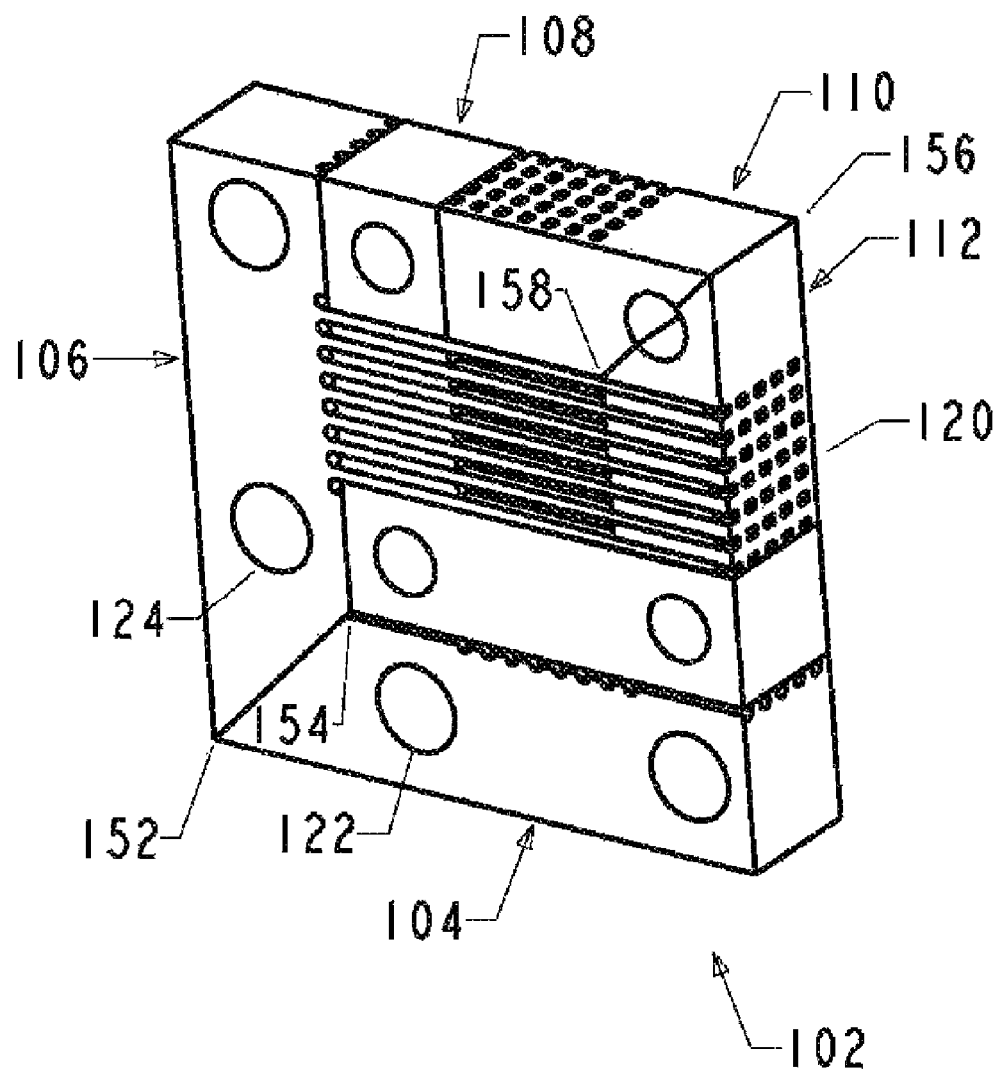
FIG. 3 is a perspective view of the mold of FIG. 2 when fully assembled and closed.

While shown as extending from only two directions in the illustrative embodiment of FIGS. 2-3, pins may extend into space 140 from any number of directions. For example, pins extend through a space in the mold from 3 directions that are equally spaced (i.e. cross each other at 60 degree angles) or, as illustrated, extend in. In some embodiments, pins extend into a space in the mold where material is provided from at least 2 directions, at least 3 directions, at least 4 directions, at least five directions, up to 12 directions, up to 10 directions, up to 8 directions, up to 6 directions, up to 4 directions, and/or up to 3 directions. In some embodiments, pins may extend in a singular direction, or may extend in more than 12 directions.

The directions in which the pins extend may define the direction in which the pores extend. Any discussion relating to the characteristics of the directions in which the pins extend is also applicable to defining potential characteristics of the direction in which the pores of a product made by the mold (or made otherwise) extend.

Bodies 104, 106, and 108 may include spaces 122, 124, and 128 that may be used to control movement of bodies 104, 106, and 108. For example, one or more tools extending through spaces 122, 124, and 128 may be used to separate bodies 104, 106, and/or 108. For example, a tool may extend through space 124 to pull pins 114 out of a product molded using mold 102 while a separate tool extends through space 128 to maintain body 108 in a fixed position.

Referring to FIGS. 2A and 3, bodies 104 and 106 may have portions (e.g. ends 202 and 203) that are shaped to conform to each other such that they form a substantially seamless exterior surface 152 and/or a substantially seamless interior surface 154. Bodies 110 and 112 may also have portions (e.g. ends 414) that are shaped to conform to each other such that they form a substantially seamless exterior surface 156 and/or a substantially seamless interior surface 158. Interior surface 158 may cooperate with interior surface 314 (FIG. 5) of body 108 to form an interior perimeter of mold 102.

The interior perimeter (e.g. formed in part by surfaces 314 and 158) of mold 102 defines at least two dimensions of space 140, and may have any shape. In some embodiments, the interior perimeter may have a shape having between three and eight sides. In some of these embodiments, the interior perimeter may have at least 4 sides (e.g. a rectangular shape) and/or up to six sides.

Figure 4A:
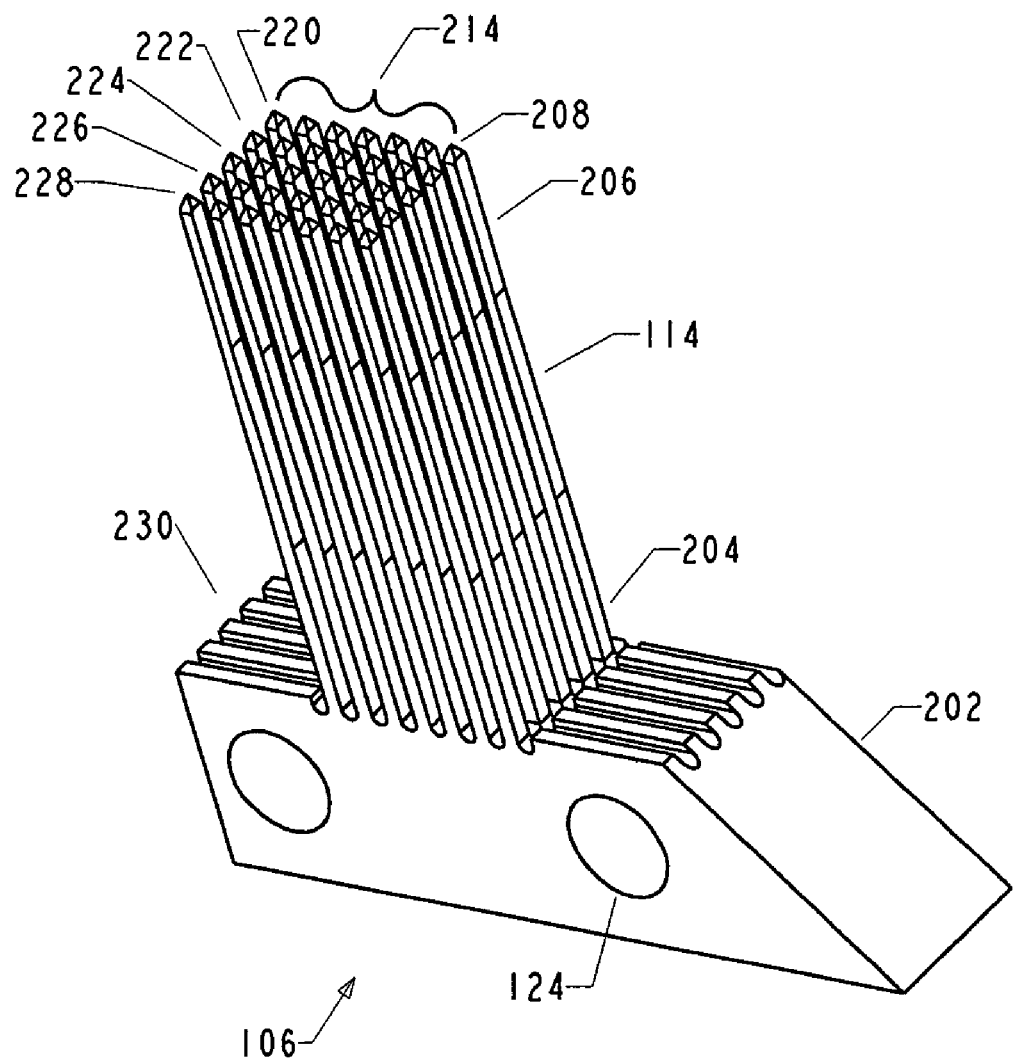
FIGS. 4A-C contain multiple views of a pin carrying body for use with the mold of FIG. 2.

Referring to FIG. 4A, body 106 is configured to carry a multiplicity of pins 114. Pins 114 may be arranged in layers 220-228 of pins 214. In many embodiments, the pins 214 of a single layer 220 may all be arranged in roughly the same plane. The multiple layers 220-228 may be arranged in parallel planes, or may be arranged in some other manner. Pins 214 may extend from their base 204 (which, in many embodiments is permanently connected to body 106) to their tips 208 (which, in many embodiments, extend through a body 110, 112 when in use).

In some embodiments, body 106 may include at least about 3, at least about 5, up to about 15, and/or up to about 20 layers of pins. In some embodiments, body 106 may include less than 3 layers of pins or more than 20 layers of pins. In some embodiments, body 106 may include divots 230 that correspond to its layers of pins.

Figures 4B, 4C:
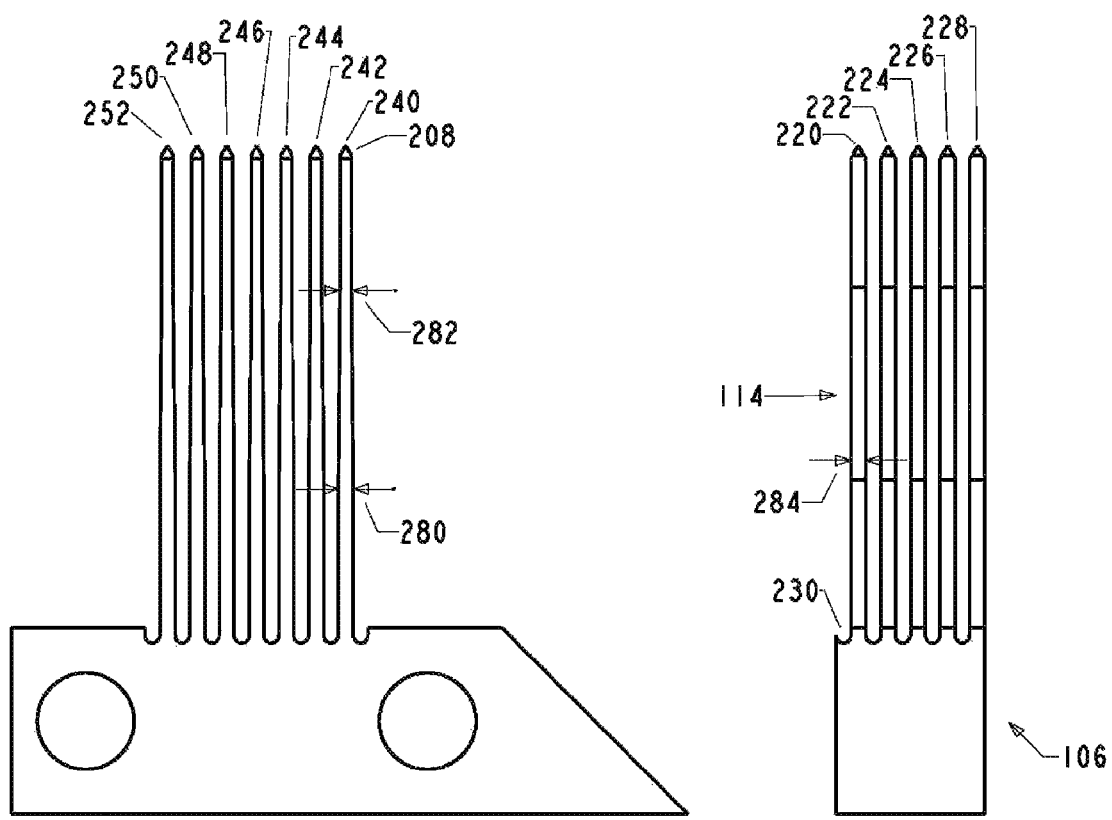

A single layer 228 of pins may include multiple pins 240-252 (FIG. 4C). According to some embodiments, a single layer 228 of pins may include at least about 3, at least about 5, up to about 15, and/or up to about 20 layers of pins. In some embodiments, a single layer 228 may include less than 3 pins or more than 20 pins.

In total, a single body 106 may be configured to carry any number of pins. In some embodiments, body 106 is configured to carry at least about 20 and/or at least about 30 pins. In some of these embodiments, body 106 is configured to carry at least about 35 and/or at least about 50 pins.

The pins from the layers of pins may be arranged in an array (e.g. an array of columns 220-228 and rows 240-252 of pins) or may be arranged in some other manner. Each layer of pins may include the same number of pins or may include different numbers of pins (e.g. when different spacing is used, when different thicknesses of pins are used, when the mold 102 forms a non-rectangular-box shape, etc.).

As shown in FIG. 4C, each pin 240 may be tapered. The pin 240 may taper from its base (e.g. near a pin carrying body 106) to its tip 208 (e.g. away from pin carrying body) such that it narrows from its base to its tip. The pin 240 may only be tapered in a single dimension (e.g. as illustrated in FIGS. 4B and 4C), or may be configured to taper in multiple directions (e.g. where the pin takes the shape of a pyramid or a cone). If pin 240 only tapers in a single dimension, pin 240 preferably tapers along a side that is not configured to contact other pins 116 (FIG. 2A). Also, if pin 240 tapers, it may taper along its entire length or may only taper over a portion of its length.

In some embodiments, the base of pin 240 may have a width 280 of at least about 10 micrometers, at least about 25 micrometers, at least about 50 micrometers, at least about 100 micrometers, at least about 200 micrometers, at least about 500 micrometers, at least about 1 mm, and/or at least about 3 mm. In some embodiments, the base of pin 240 may have a width 280 of up to about 30 mm, up to about 15 mm, up to about 7 mm, up to about 5 mm, up to about 1 mm, up to about 500 micrometers, and/or up to about 250 micrometers. In some embodiments, pin 242 may have a width of less than 10 micrometers or more than 30 mm.

If pin 242 has a width that tapers, pin 242 may taper in some embodiments such that the width 282 of the pin about two thirds away from the base of the pin 240 decreases at least 5%, at least 10%, and/or at least 20% from the width 280 near its base 204 and/or near its widest point. In some embodiments, the width 282 of pin 242 may decrease up to about 50%, up to about 40% and/or up to about 30% from the width 280 near its base 204 and/or near its widest point.

A pin may have a height 284, according to some embodiments, of at least about 10 micrometers, at least about 25 micrometers, at least about 50 micrometers, at least about 100 micrometers, at least about 200 micrometers, at least about 500 micrometers, at least about 1 mm, and/or at least about 3 mm. In some embodiments, pin 242 may have a height 284 of up to about 30 mm, up to about 15 mm, up to about 7 mm, up to about 5 mm, up to about 1 mm, up to about 500 micrometers, and/or up to about 250 micrometers. In some embodiments, pin 242 may have a height of less than 10 micrometers or more than 30 mm.

If a pin has a height 284 that tapers, the pin may taper in some embodiments such that the height decreases at least 5%, at least 10%, and/or at least 20% from the height near its base and/or near its thickest point. In some embodiments, the height of the pin may decrease up to about 50%, up to about 40% and/or up to about 30% from the height near its base and/or near its thickest point.

As shown in FIGS. 4B and 4C, pin 242 may include a more severe taper at its tip, such that pin 242 may come to a point. This second taper may be located at a point that is not exposed to a space 140 of the mold into which some or all of the material to be molded is provided.

In some embodiments, pin 242 may have a length of at least about 1 mm, at least about 5 mm, at least about 10 mm, at least about 20 mm, at least about 40 mm, and/or at least about 80 mm. In some embodiments, pin 242 may have a length of up to about 400 mm, up to about 200 mm, up to about 100 mm, up to about 75 mm, up to about 50 mm, up to about 40 mm, up to about 30 mm, up to about 20 mm, and/or up to about 10 mm. In some embodiments, pin 242 may have a length less than 1 mm or more than 400 mm.

Each of pins 114 may have the same potential properties as discussed above for pins 240, 242 or may have different properties. Further, each of pins 114 may be the same, or some or all may be different.

Body 104 and pins 116 carried by body 104 can have the same properties as body 106 and pins 114 carried by body 106.

Mold 102 (FIG. 2) may include at least about 40 and/or at least about 60 pins. In some of these embodiments, mold 102 may include at least about 70 and/or at least about 90 pins. In some embodiments, mold 102 may include less than about 200, less than about 150, and/or less than about 100 pins. In some embodiments, mold 102 may include less than 40 or more than 200 pins.

The pins 116 and pin carrying body 104 can be an integral piece, can be permanently connected to each other, can be removably connected to each other, some other configuration, or a combination of these configurations.

A multiplicity of pins 114, 116, etc. (e.g. 10 or more, 20 or more, 30 or more, 40 or more, all, almost all, etc.) may have substantially the same (e.g. within 5%, within 10%, and/or within 20%) cross-sectional area and/or shape as each other.

A product made using pins 114, 116 may include tool marks where pins 114, 116 have been removed, where the product contacted pin carrying bodies 104, 106, and/or other tool marks.

Figure 5:
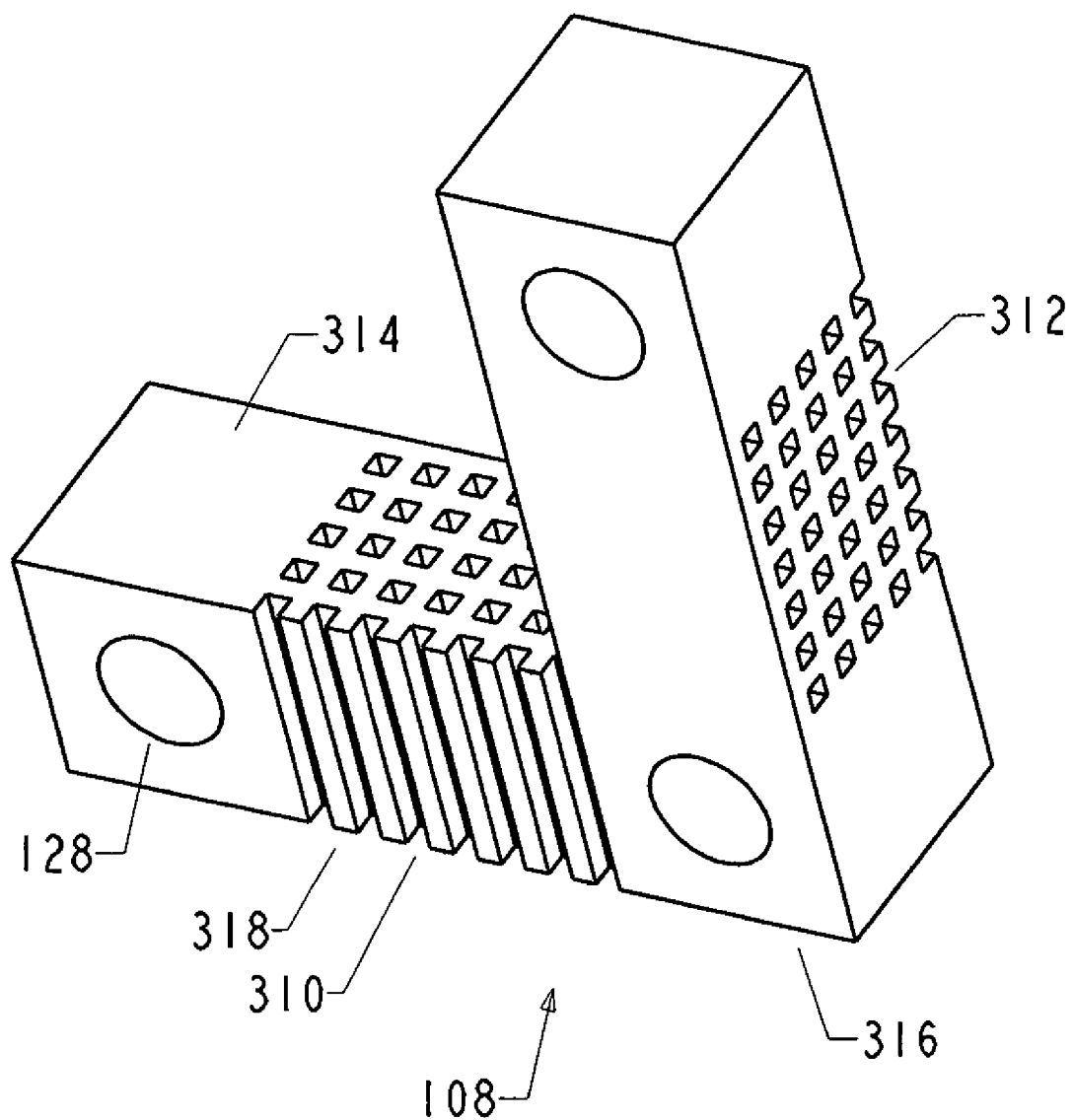
FIG. 5 is a perspective view of an angled pin receiving body.

Referring to FIG. 5, mold 102 (FIG. 2A) may include a body 108 configured to include spaces 310, 312 through which pins can extend. Spaces 310, 312 may be configured to have roughly the same dimensions and/or shape as the pins and/or portions of pins that extend through them, and the spaces may include any of the dimensions discussed above for pins 240, 242. As shown in FIG. 5, spaces 318 near the surface of body 108 may be formed as grooves. Also, the spaces 310, 312 are preferably arranged in the same or similar pattern to the pattern in which the pins are arranged.

Spaces 310 or 312 may all be the same, or may be different. For example, all the spaces may be roughly the same shape and dimensions organized in an array. As another example, if a pin carrying body includes some pins that extend perpendicular to body 108 and others that do not extend perpendicular to body 108, then body 108 may include spaces that are straight uniform spaces and others that are wider at the surface facing the pin carrying body and narrower at the surface facing space 140 (FIG. 1).

A single body 108 may include spaces 310, 312 configured to receive pins carried by multiple pin carrying elements 104, 106. Such a body 108 may include one or more bends 316 that change the direction in which the body 108 extends. The bend may be abrupt (as shown) or may be smooth (e.g. curved).

Body 108 may include at least 20, at least 30, at least 40, at least 60, at least 80, and/or at least 100 spaces configured to receive pins.

In some embodiments, one, some, or all of spaces 310, 312 may have a cross sectional area of at least about 2500 square micrometers, at least about 0.01 square millimeters, at least about 0.1 square millimeters, at least about 0.2 square millimeters, at least about 1 square millimeter, up to about 1 square centimeter, up to about 1 square millimeter, up to about 0.5 square millimeters, up to about 0.3 square millimeters, up to about 0.2 square millimeter, and/or up to about 0.1 square millimeter. In some embodiments, the cross-sectional area may be less than 2500 square micrometers or greater than 1 square centimeter.

Figure 6:
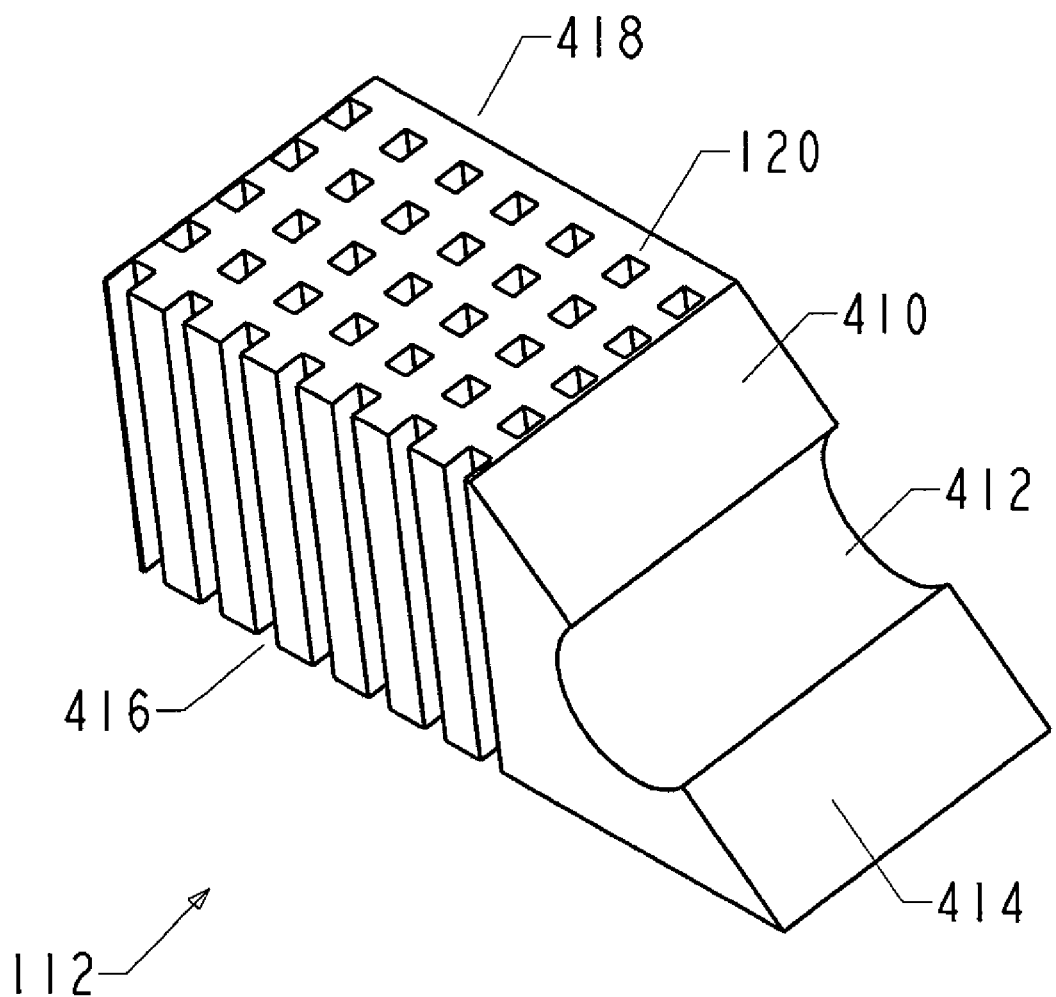
FIG. 6 is a perspective view of a pin receiving body which may be used as a cap in the mold of FIG. 2.

Referring to FIG. 6, a pin receiving body 112 includes a multiplicity of spaces 120. Spaces 120 may be configured to have roughly the same dimensions and/or shape as the pins and/or portions of pins that extend through them, and the spaces may include any of the dimensions discussed above for pins 240, 242. As shown in FIG. 6, spaces 416 near the surface of body 112 may be formed as grooves. Also, the spaces 120 are preferably arranged in the same or similar pattern to the pattern in which the pins are arranged.

Spaces 120 may all be the same, or may be different. For example, all the spaces may be roughly the same shape and dimensions organized in an array. Body 112 may include at least 20, at least 30, at least 40, at least 60, at least 80, and/or at least 100 spaces configured to receive pins.

In some embodiments, one, some, or all of spaces 120 may have a cross sectional area of at least about 2500 square micrometers, at least about 0.01 square millimeters, at least about 0.1 square millimeters, at least about 0.2 square millimeters, at least about 1 square millimeter, up to about 1 square centimeter, up to about 1 square millimeter, up to about 0.5 square millimeters, up to about 0.3 square millimeters, up to about 0.2 square millimeter, and/or up to about 0.1 square millimeter. In some embodiments, the cross-sectional area may be less than 2500 square micrometers or greater than 1 square centimeter. In some embodiments, the cross-sectional area of a space 120 through which a pin is configured to extend may be about the same as the cross-sectional area of a space 310,312 in body 108 through which that pin is configured to extend. In some embodiments, the cross-sectional area of a space 120 through which a pin is configured to extend may be less than the cross-sectional area of a space 310, 312 in body 108 through which that pin is configured to extend.

Body 112 may include a face 410 configured to extend at an angle with respect to the face 418 through which the pins extend. In some embodiments, face 410 may extend at an angle of at least about 15 degrees, at least about 30 degrees, up to about 60 degrees, and/or up to about 75 degrees. Face 410 may contain a partial cut-out 412 (e.g. a semi-circular space), which may be used by a tool to remove the molded product from the mold.

While referred to as pins 114, 116, the same disclosure is relevant to any space forming element such as pins, cores, or other shaping elements for creating spaces in a molded product. The space forming elements may have any shape whether straight, curved, multi-sided, single sided, regularly shaped, irregularly shaped, uniformly thick, non-uniformly thick (e.g. ordered non-uniform such as tapered, disordered non-uniform such as random thickness), etc. Each of the space forming elements may be solid, may be hollow, may have a single composition throughout, may have a varying composition, may include outer coatings on substantially all or portions of its surface, and/or may have any other property. Each of the space forming elements carried by a body and/or in a mold may be roughly the same (i.e. the same or close to the same) shape and/or size, some may be roughly the same shape and/or size, none may be the same shape and/or size, etc.

While spacer body 108 is shown as a single piece, in some embodiments, spacer body 108 may be formed from more than one piece. Also, while convenient to have multiple end spacer bodies 110, 112, a system could include a single end spacer body. Further, in some embodiments, mold 102 may not include a spacer body 108 or an end spacer body 110 or 112. References to spacer bodies 108, 110, and 112 are equally applicable to any type of body, including non-spacer bodies.

While shown as extending straight across, any of the pins discussed above may be curved (fully or partially) or take any other shape.

A structure made according to any of the embodiments above may have intersecting struts that are essentially continuous and/or essentially fluid (e.g. have no major gaps between layers of struts at the intersections of those layers other than that caused by the material generally or are caused by the particular tool design). In some embodiments, a structure has a multiplicity of (e.g. at least about 20, 30, 40, 50, 60, 80, 100, 150, 200, 250, etc.), substantially all, essentially all, or all strut intersections (e.g. joints) that are essentially continuous and/or essentially fluid.

A structure made according to any of the embodiments discussed above may be configured to be flexible (e.g. capable of make a 45 degree bend), essentially flexible (e.g. capable of making at least a 15 degree bend), essentially rigid (not flexible or essentially flexible), and/or rigid (e.g. not capable of making a 5 degree bend). A structure made according to any of the embodiments above may have a first portion that is rigid (and/or essentially rigid) while have a second portion that is flexible (and/or essentially flexible). Also, a structure made according to any of the embodiments above may have at least a portion that is essentially flexible but not flexible and/or may have at least a portion that is essentially rigid but not rigid.

A structure made according to any of the embodiments above may be capable of making a bend of at least about 10, at least about 20, at least about 30, at least about 45, at least about 60, at least about 90, at least about 100 degree, at least about 120 degrees, at least about 150 degrees, and/or at least about 170 degrees. A structure made according to any of the embodiments above may be capable of making a bend of no more than 170 degrees, no more than about 150 degrees, no more than about 120 degrees, no more than about 100 degrees, no more than about 90 degrees, no more than about 60 degrees, no more than about 45 degrees, no more than about 30 degrees, no more than about 20 degrees, and/or no more than about 10 degrees. The bend may form a sharp angle, may occur smoothly over a length of the structure, etc.

A structure according to any of the embodiments discussed above may also have resilient flexibility (i.e. the ability to be compressed like a sponge). A structure according to any of the embodiments described above may have sufficient resilient flexibility that it can be resiliently compressed (i.e. compress under pressure and then substantially uncompress when the pressure is removed) to at 90% of its volume, can be compressed to at least 85% of its volume, can be compressed to at least 80% of its volume, can be compressed to at least 75% of its volume, can be compressed to at least 70% of its volume, can be compressed to at least 65% of its volume, can be compressed to at least 60% of its volume, can be compressed to at least 50% of its volume, can be compressed to at least 40% of its volume, and/or can be compressed to at least 30% of its volume.

A structure according to any of the embodiments described above may include a foaming agent in one or more structural members of the structure.

A porous structure according to any of the embodiment discussed above may comprise a multiplicity of ordered structural members defining the porous structure having pores that extend in three dimensions, the multiplicity of structural members intersecting to form structural member intersections, substantially all of the structural member intersections being essentially fluid, and a multiplicity of the pores defines by the multiplicity of structural members substantially extending in a natural direction. The multiplicity of structural members may comprise at least about 100 points of contact within an area of up to about 1000 cubic millimeters.

A structure made according to any of the embodiments disclosed above may include structural members which are porous. The pores of the structural members may be ordered or may be unordered (e.g. may have randomly varying sizes and/or may be arranged in an irregular pattern).

The pores defined by structural members may be arranged in a regular and/or repeating pattern. As discussed above, the pores (e.g. all, substantially all, some, etc.) may be about a same size and/or shape as each other.

Any of the tools shown in FIGS. 2-6 may be formed by any number of different processes. For example, the tools (e.g. pins, pin carrying bodies, pin receiving bodies, etc.) can be formed by a molding process, electro-discharge machining (EDM) (e.g. micro EDM), a laser forming process, a chemical process (e.g. a chemical etching process), a photo-forming process, etc.

Examples of molds and products made by the molds are shown with respect to FIGS. 7A to 16B.

Referring to FIGS. 7A and 7B, a molded product 650 made using a mold as described above, the mold having pins 612-618 overlapping in space 610 as shown in FIG. 7B when the mold is joined and closed. Pins 612-618 are rectangular pins having four surfaces. The pins have a greater width than their height.

Molded ordered porous structure 650 includes multiple spaces 652,654 that correspond in shape and dimension to pins 612-618. Spaces 652 and 654 are interconnected through the various points of contact of the spaces in molded ordered porous structure 650. Molded ordered porous structure 650 also includes struts 660 that are configured to provide support to and define structure 650. Struts 660 correspond in shape and dimension to the spaces between pins 612-618.

Referring to FIGS. 8A and 8B, a molded product 750 is made using a mold as described above, the mold having pins 712-718 overlapping in space 710 as shown in FIG. 8B when the mold is joined and closed. Pins 712-718 are trapezoidal pins having four surfaces.

Molded ordered porous structure 750 includes multiple spaces 752,754 that correspond in shape and dimension to pins 712-718. Spaces 752 and 754 are interconnected through the various points of contact of the spaces in molded ordered porous structure 750. Molded ordered porous structure 750 also includes struts 760 that are configured to provide support to and define structure 750. Struts 760 correspond in shape and dimension to the spaces between pins 712-718.

Figure 9A:
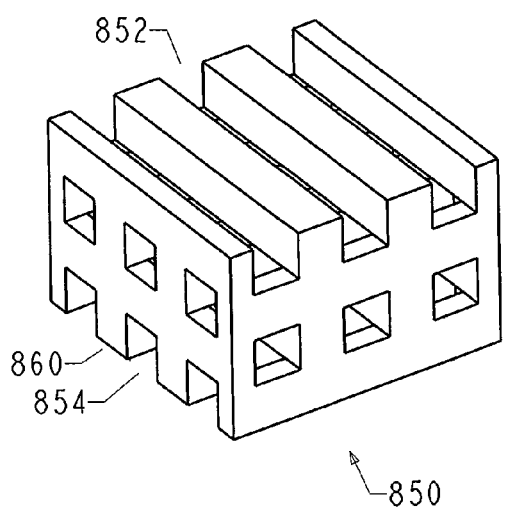
Figure 9B:
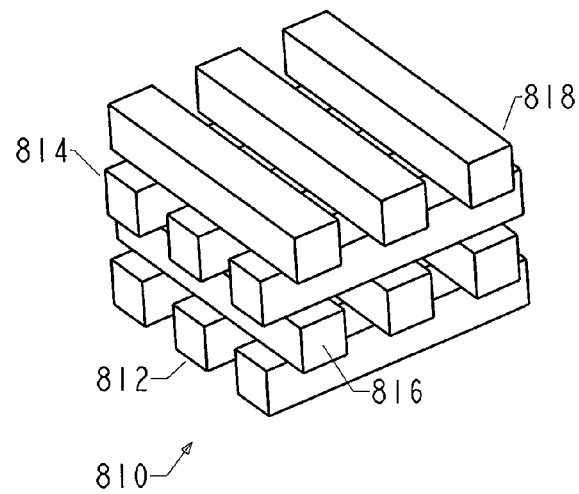

Referring to FIGS. 9A and 9B, a molded product 850 is made using a mold as described above, the mold having pins 812-818 overlapping in space 810 as shown in FIG. 9B when the mold is joined and closed. Pins 812-818 are square pins having four surfaces.

Molded ordered porous structure 850 includes multiple spaces 852,854 that correspond in shape and dimension to pins 812-818. Spaces 852 and 854 are interconnected through the various points of contact of the spaces in molded ordered porous structure 850. Molded ordered porous structure 850 also includes struts 860 that are configured to provide support to and define structure 850. Struts 860 correspond in shape and dimension to the spaces between pins 812-818.

Figures 10A, 10B:
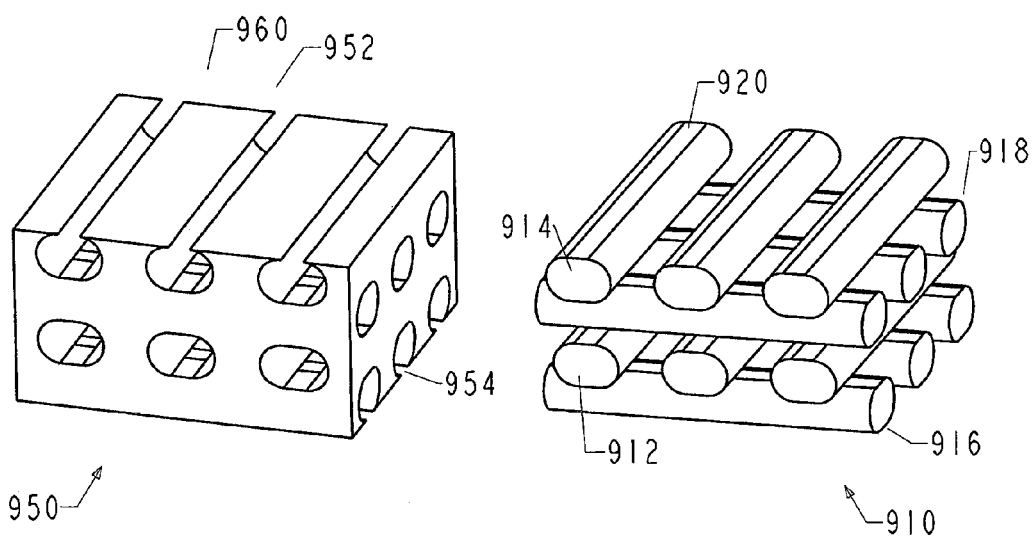

Referring to FIGS. 10A and 10B, a molded product 950 is made using a mold as described above, the mold having pins 912-918 overlapping in space 910 as shown in FIG. 10B when the mold is joined and closed. Pins 912-918 are partially ovals having a single curved surface. The pins 912,914 contact pins 918 on opposite sides of the surface of pins 918 on an elongated or flat portion of the surface such as that represented by the rectangular area 920 shown in FIG. 10B.

Molded ordered porous structure 950 includes multiple spaces 952,954 that correspond in shape and dimension to pins 912-918. Spaces 952 and 954 are interconnected through the various points of contact of the spaces in molded ordered porous structure 950. Molded ordered porous structure 950 also includes struts 960 that are configured to provide support to and define structure 950. Struts 960 correspond in shape and dimension to the spaces between pins 912-918.

Figure 11A:
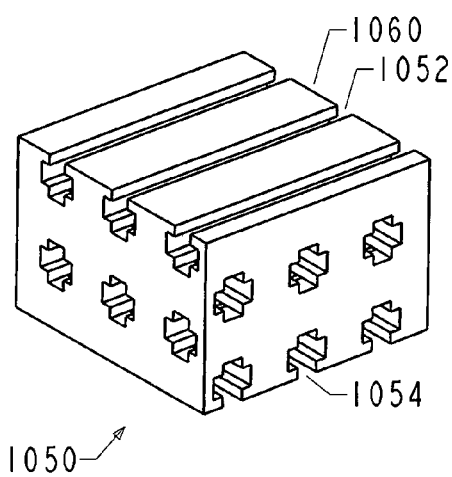
Figure 11B:
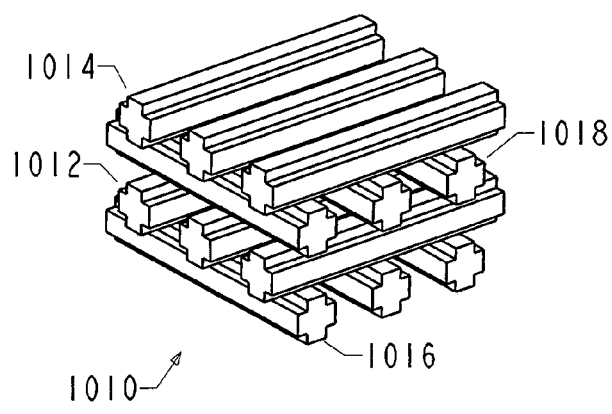

Referring to FIGS. 11A and 11B, a molded product 1050 is made using a mold as described above, the mold having pins 1012-1018 overlapping in space 1010 as shown in FIG. 11B when the mold is joined and closed. Pins 1012-1018 are plus-shaped and have twelve surfaces.

Molded ordered porous structure 1050 includes multiple spaces 1052,1054 that correspond in shape and dimension to pins 1012-1018. Spaces 1052 and 1054 are interconnected through the various points of contact of the spaces in molded ordered porous structure 1050. Molded ordered porous structure 1050 also includes struts 1060 that are configured to provide support to and define structure 1050. Struts 1060 correspond in shape and dimension to the spaces between pins 1012-1018.

Figure 12A:
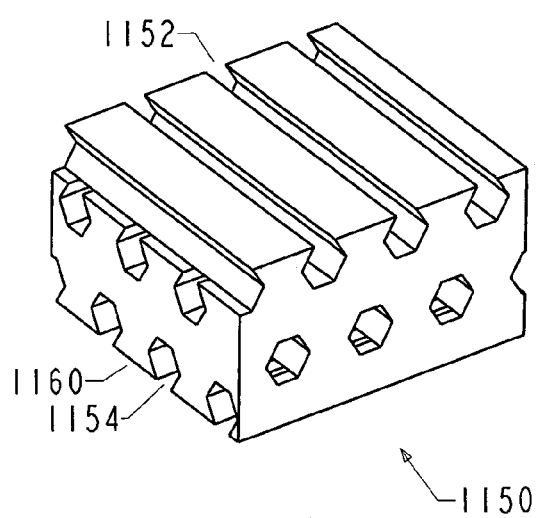
Figure 12B:
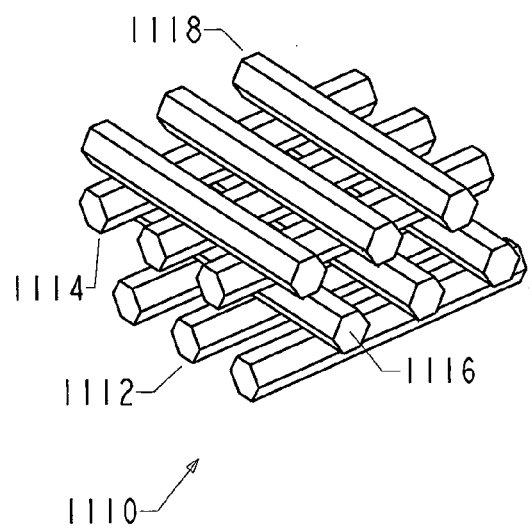

Referring to FIGS. 12A and 12B, a molded product 1150 is made using a mold as described above, the mold having pins 1112-1118 overlapping in space 1110 as shown in FIG. 12B when the mold is joined and closed. Pins 1112-1118 are hexagons having six surfaces.

Molded ordered porous structure 1150 includes multiple spaces 1152,1154 that correspond in shape and dimension to pins 1112-1118. Spaces 1152 and 1154 are interconnected through the various points of contact of the spaces in molded ordered porous structure 1150. Molded ordered porous structure 1150 also includes struts 1160 that are configured to provide support to and define structure 1150. Struts 1160 correspond in shape and dimension to the spaces between pins 1112-1118.

Figures 13A, 13B:
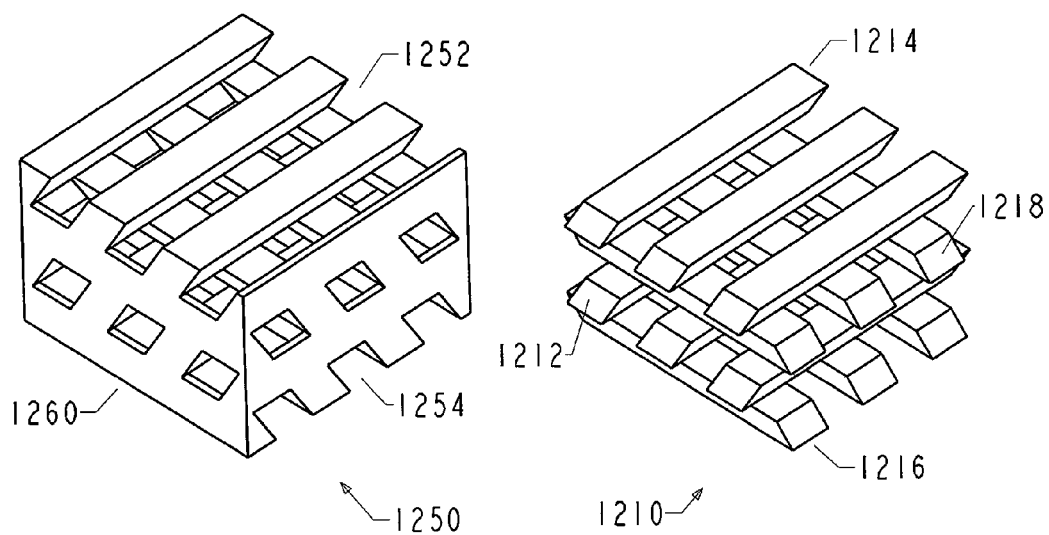

Referring to FIGS. 13A and 13B, a molded product 1250 is made using a mold as described above, the mold having pins 1212-1218 overlapping in space 1210 as shown in FIG. 13B when the mold is joined and closed. Pins 1212-1218 are parallelograms having four surfaces.

Molded ordered porous structure 1250 includes multiple spaces 1252,1254 that correspond in shape and dimension to pins 1212-1218. Spaces 1252 and 1254 are interconnected through the various points of contact of the spaces in molded ordered porous structure 1250. Molded ordered porous structure 1250 also includes struts 1260 that are configured to provide support to and define structure 1250. Struts 1260 correspond in shape and dimension to the spaces between pins 1212-1218.

Figure 14A:
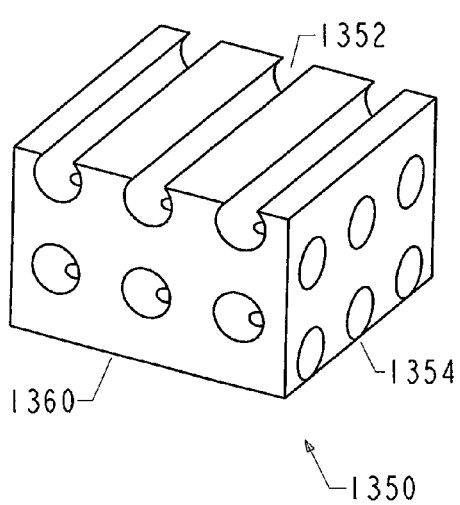
Figure 14B:
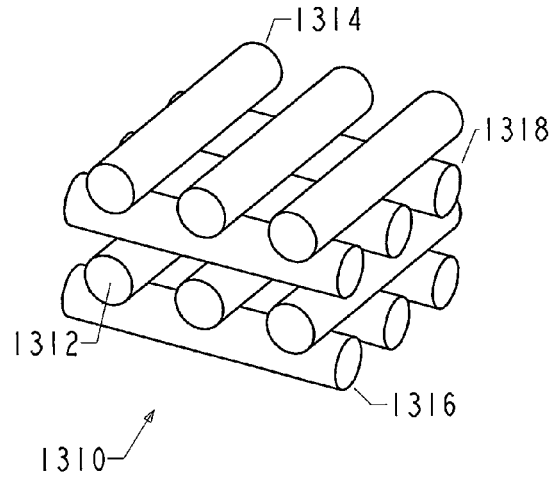

Referring to FIGS. 14A and 14B, a molded product 1350 is made using a mold as described above, the mold having pins 1312-1318 overlapping in space 1310 as shown in FIG. 14B when the mold is joined and closed. Pins 1312-1318 are cylindrical rods having a single surface.

Molded ordered porous structure 1350 includes multiple spaces 1352,1354 that correspond in shape and dimension to pins 1312-1318. Spaces 1352 and 1354 are interconnected through the various points of contact of the spaces in molded ordered porous structure 1350. Molded ordered porous structure 1350 also includes struts 1360 that are configured to provide support to and define structure 1350. Struts 1360 correspond in shape and dimension to the spaces between pins 1312-1318.

Referring to FIGS. 15A&B, a molded ordered porous structure 1410 includes a plurality of struts 1412-1420. The plurality of struts contain holes/spaces 1422-1430 within the struts which are formed in a general shape of the pins (not illustrated) used to form the structure 1410. In the embodiment illustrated, the holes/spaces 1422-1430 are interconnected in three dimensions and extend to the surfaces of the structure in two dimensions. However, the holes 1422-1430 could be formed to extend to the surface in three dimensions by not coating the top of the pins at the top of the mold, by using a third set of pins extending in a third dimension, etc.

The struts 1412-1420 also include spaces 1432-1440 between the struts which correspond to spaces between the pins used to form structure 1410. In the embodiment illustrated, spaces 1432-1440 are interconnected in three dimensions and extend to the surface of structure 1410 in three dimensions.

In the embodiment illustrated, spaces 1422-1430 do not interconnect with spaces 1432-1440. Thus, spaces 1422-1440 define two independent pore systems.

Figure 16A:
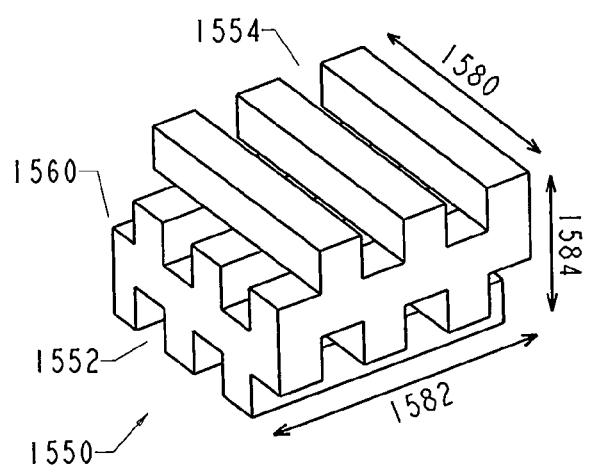
FIGS. 16A&B are an illustration of a molded ordered porous structure having offset struts and an offset pin arrangement for forming the structure.
Figure 16B:
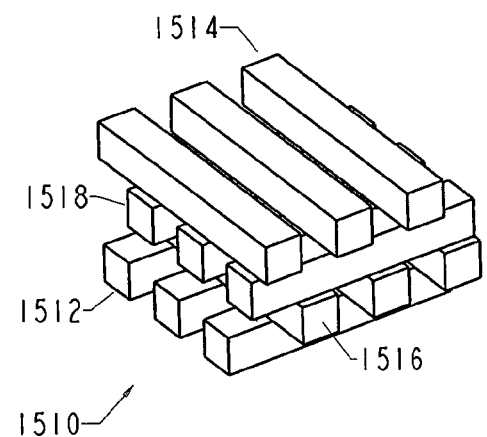

Referring to FIGS. 16A and 16B, a molded product 1550 is made using a mold as described above, the mold having pins 1512-1518 overlapping in space 1510 as shown in FIG. 16B when the mold is joined and closed.

Molded ordered porous structure 1550 includes multiple spaces 1552,1554 that correspond in shape and dimension to pins 1512-1518. Spaces 1552 and 1554 are interconnected through the various points of contact of the spaces in molded ordered porous structure 1550. The spaces extend substantially straight in a first direction 1580 and a second direction 1582, but follow a tortuous (non-straight, non-natural) path in a third direction 1584 because the struts 1560 that define the structure (and the pins 1512-1518 of the mold used to define the spaces) are offset in that third direction.

Molded ordered porous structure 1550 also includes struts 1560 that are configured to provide support to and define structure 1550. Struts 1560 correspond in shape and dimension to the spaces between pins 1512-1518. Struts 1560 are also offset such that two adjacent layers that extend in the same direction (i.e. the next layer that extends in roughly the same direction as the reference layer) are offset from each other such that the struts do not fully (or essentially) overlap.

While spaces are shown in FIG. 16A as being off-set in only one direction, the spaces may be off-set in multiple directions. Also, a similar effect could be achieved, at least in part, by using multiple layers of pins that extend in more than two directions. Additionally, while the struts from adjacent layers that extend in the same direction are shown as having no overlap, in some embodiments the struts in these layers will overlap at least one or at least two struts from the adjacent layer.

Any of the dimensions discussed herein for items having a parameter that is variable across the item can be for the minimum dimension of the item for the parameter, the maximum dimension of the item for the parameter, and/or the average dimension of the item for the parameter. All such possibilities are expressly considered, including applying all such combinations of the dimensions (e.g. a pin may have a maximum height less than 1 mm and an average height less than 500 microns).

It should be understood that the dimensions and other characteristics of the mold above equally define the product that can be made by the mold. Any characteristic of the mold discussed above should also be taken as a description of a characteristic of a product made by the mold. For example, any characteristic of a pin of the mold would be a characteristic of a space of the molded product. As a specific example, a pin of the mold that tapers is equally a description of a space in the finished product that tapers. Any dimensions listed above for the pins are also to be taken as potential dimensions for the spaces of the molds. Also, any description of potential arrangements and/or contacts of pins above would also be a description of potential arrangements and/or contacts of the spaces of a product made from the mold. Additionally, any description of potential arrangements and/or contacts of spaces between pins above would also be a description of potential arrangements and/or contacts of the struts or other structural member of a product made from the mold. All such characteristics of the mold that are also applicable to a product made from the mold are contemplated herein as potential characteristics of the products even where not specifically recited, and should be considered part of the novel subject matter contemplated by the inventors. Additionally, the reverse is also true; any characteristic of a product made from a mold that is also applicable as a characteristic of a mold used to make the product, is contemplated herein even where not specifically recited, and should be considered part of the novel subject matter contemplated by the inventors.

Also, any dimension disclosed herein with more than one of that structure (e.g. pins or other shaping elements, pores, struts, spaces, etc.) disclosed herein may be applied (if specifically recited in a claim below) to an individual structure; a plurality of the recited structures; multiple of the recited structures; substantially all of the recited structures; essentially all of the recited structures; an average of a plurality, multiplicity, substantially all, essentially all, or all of the recited structures; or a typical average (i.e. an average that excludes the 30% most extreme values of the recited structures) of a plurality, multiplicity, substantially all, essentially all, or all of the recited structures. All such combinations are contemplated below. Further, unless recited otherwise in the claim, a claim to a dimension is a claim to at least one individual structure having a particular dimension. Unless stated otherwise, the inclusion of structures not meeting the dimension would not exclude them from coverage where the required number of structures meeting the dimension requirements are present.

Also, any dimension disclosed herein may be applied (if specifically recited in a claim below) to an individual pin/element; a plurality of pins/elements; multiple pins/elements; substantially all pins/elements; essentially all pins/elements; an average of a plurality, multiplicity, substantially all, essentially all, or all pins/elements; or a typical average of a plurality, multiplicity, substantially all, essentially all, or all pins/elements. All such combinations are contemplated below.

Also, any disclosure of a list of materials that may be used includes structures consisting or consisting essentially of one or more of the listed materials, and/or comprising any combination of two or more of the listed materials. All such combinations are contemplated.

Additionally, any reference to something occurring within an area having a volume should be judged based on an area having a regular shape (e.g. sphere, cube, etc.) and/or a shape matching that of the space of the mold if such a shape is not, nor is approximately, a regular shape.

Reference to bioresorbable materials can be a reference to materials that degrade through bioerosion, bioresorption, and/or bioabsorption.

EXAMPLES

The following examples are provided by way of example only are not intended to be limiting. Additional features of the invention are seen in the following examples, including the various features shown in the charts; those discussed in the text and those not specifically discussed in the text.

Example 1

A bioresorbable ceramic material is made using the mold-based forming process discussed above. A tri-calcium phosphate (TCP) injection molding feedstock was prepared according to the formulation shown in the following table.

| | |
|---|---|
| Tri calcium Phosphate | 448 g ± 1 g |
| Paraffin wax | 36.00 g + 0.05 g |
| Polyethylene | 15.25 g + 0.05 g |
| Polypropylene | 46.00 g + 0.05 g |
| Stearic acid | 6.25 g + 0.05 g |

The structure was molded using a Arburg Allrounder 420S injection molding machine and a Regoplas 150S mold temperature control unit using the following parameters:

| | |
|---|---|
| Melt temperature (° C.) | 188 |
| Tool temperature (° C.) | 43 |
| Injection speed (cm$^3$/sec) | 25 |
| Packing pressure (bar) | 1200 |
| Hold time (s) | 2 |
| Cooling time (s) | 18 |

The TCP feedstock was injection molded into ordered core structure shown in FIGS. 2-5. The green ceramic structure was then debound in heptane at 60° C. to remove wax, to 600° C. to remove the polyethylene, polyproplene, and stearic acid, and to 1150° C. for 5 hours to sinter.

The final sintered TCP structure had openings of about 300 μm by 400 μm.

The compression strength of this TCP structure is about 100 MPa. This compression strength is several orders of magnitude higher than a similar structure made by slip coating a foam with TCP.

Example 2

A structure is made as disclosed in Example 1 and has opening of about 125 μm by about 125 μm.

Example 3

A structure is made as disclosed in Example 1. The structure is coated with a polymer such that it contains medicine and/or drugs within the spaces defined by the struts of the structure.

Example 4

A structure is made as disclosed in Example 1. The structure is coated with a liquid such that it contains medicine and/or drugs within the spaces defined by the struts of the structure.

Example 5

A structure is made as disclosed in Example 1. The structure is introduced to a source of cells such that cells can grow within the structure.

Example 6

A bio-inert ceramic material is made using the mold-based forming process discussed above, using an injection molding feedstock commercially available as Catamold AO-F. This feedstock is 99.8% α-alumina in a polyethylene/polyacetal matrix. An ordered porous structure of alumina was produced by injection molding the Catamold AO-F with the mold described above on an injection molding machine. The structure was molded using a Airburg Allrounder 420S injection molding machine and a Regoplas 150S mold temperature control unit using the following parameters:

| | |
|---|---|
| Melt temperature (° C.) | 193 |
| Tool temperature (° C.) | 132 |
| Injection speed (cm³/sec) | 25 |
| Packing pressure (bar) | 1200 |
| Hold time (s) | 2 |
| Cooling time (s) | 18 |

The structures were formed in the shape of cubes. The cubes were measured for outside dimensions and the mass was obtained to calculate the bulk density. Some error was introduced because some struts broke out when the gate was removed.

Compression strength was measured for these structures using the procedure detailed above. If the cubes were "edge" loaded rather than face loaded this caused a higher amount of localized stress leading to a lower overall compressive stress value.

| Sample # | Length (mm) | Width (mm) | Height (mm) | Weight (g) | Bulk Density (g/cc) | Porosity % | Material % |
|---|---|---|---|---|---|---|---|
| 1 | 5.49 | 5.56 | 4.34 | 0.255 | 1.92 | 49 | 51 |
| 2 | 5.61 | 5.49 | 4.34 | 0.259 | 1.94 | 50 | 50 |
| 3 | 5.54 | 5.59 | 4.32 | 0.254 | 1.90 | 49 | 51 |
| 4 | 5.46 | 5.59 | 4.32 | 0.256 | 1.94 | 50 | 50 |
| 5 | 5.4 | 5.55 | 4.41 | 0.252 | 1.91 | 49 | 51 |
| 6 | 5.44 | 5.55 | 4.3 | 0.256 | 1.97 | 51 | 49 |
| 7 | 5.58 | 5.42 | 4.37 | 0.258 | 1.95 | 50 | 50 |
| 8 | 5.31 | 5.55 | 4.49 | 0.255 | 1.93 | 49 | 51 |
| 9 | 5.49 | 5.56 | 4.27 | 0.253 | 1.94 | 50 | 50 |
| 10 | 5.44 | 5.56 | 4.3 | 0.251 | 1.93 | 49 | 51 |
| 11 | 5.44 | 5.56 | 4.28 | 0.246 | 1.90 | 49 | 51 |
| 12 | 5.51 | 5.56 | 4.3 | 0.258 | 1.96 | 50 | 50 |
| 13 | 5.4 | 5.55 | 4.35 | 0.256 | 1.96 | 50 | 50 |
| 14 | 5.41 | 5.57 | 4.49 | 0.259 | 1.91 | 49 | 51 |
| 15 | 5.51 | 5.56 | 4.29 | 0.252 | 1.92 | 49 | 51 |
| 16 | 5.39 | 5.56 | 4.59 | 0.26 | 1.89 | 48 | 52 |
| 17 | 5.36 | 5.55 | 4.35 | 0.253 | 1.96 | 50 | 50 |
| 18 | 5.41 | 5.56 | 4.45 | 0.259 | 1.93 | 50 | 50 |
| 19 | 5.42 | 5.55 | 4.45 | 0.259 | 1.93 | 50 | 50 |
| 20 | 5.42 | 5.57 | 4.32 | 0.25 | 1.92 | 49 | 51 |

| Sample # | Breaking force Newtons | Deflection Mm | Comp. Stress MPa | Strain | Modulus MPa |
|---|---|---|---|---|---|
| 1 | 5179 | 0.278 | 169.67 | 0.06 | 2648.77 |
| 2 | 5082 | 0.27 | 165.01 | 0.06 | 2652.32 |
| 3 | 3969 | 0.265 | 128.16 | 0.06 | 2089.28 |
| 4 | 5316 | 0.287 | 174.17 | 0.07 | 2621.70 |
| 5 | 2099 | 0.4 | 70.04 | 0.09 | 772.15 |
| 6 | 5987 | 0.229 | 198.30 | 0.05 | 3723.49 |
| 7 | 4262 | 0.295 | 140.92 | 0.07 | 2087.56 |
| 8 | 3012 | 0.334 | 102.20 | 0.07 | 1373.94 |
| 9 | 5050 | 0.25 | 165.44 | 0.06 | 2825.74 |
| 10 | 2228 | 0.43 | 73.66 | 0.10 | 736.62 |
| 11 | 1725 | 0.351 | 57.03 | 0.08 | 695.43 |
| 12 | 5349 | 0.278 | 174.60 | 0.06 | 2700.66 |
| 13 | 4901 | 0.305 | 163.53 | 0.07 | 2332.32 |
| 14 | 7280 | 0.232 | 241.59 | 0.05 | 4675.60 |
| 15 | 3743 | 0.298 | 122.18 | 0.07 | 1758.87 |
| 16 | 4261 | 0.262 | 142.18 | 0.06 | 2490.92 |
| 17 | 2988 | 0.396 | 100.44 | 0.09 | 1103.36 |
| 18 | 3253 | 0.314 | 108.15 | 0.07 | 1532.65 |
| 19 | 4509 | 0.365 | 149.90 | 0.08 | 1827.49 |
| 20 | 3487 | 0.32 | 115.50 | 0.07 | 1559.31 |

The average values for these parameters is shown in the following table.

| Parameter | Average | Std. Deviation |
|---|---|---|
| Bulk Density (g/cc) | 1.93 | 0.02 |
| Porosity (%) | 49.51 | 0.58 |
| Material (%) | 50.49 | 0.58 |
| Breaking Force (Newtons) | 4184.00 | 1400.56 |
| Deflection (mm) | 0.31 | 0.06 |
| Comp. Stress (MPa) | 138.13 | 45.92 |
| Strain | 0.07 | 0.01 |
| Moldulus (MPa) | 2110.41 | 1004.21 |

The parts made through this example would have a compression strength at least one order of magnitude greater than a similar product made by slip coating a reticulated foam.

Example 7

A mold-based forming process was used to form a stainless steel structure. Stainless steel alloy Catamold 316 feedstock supplied by BASF was molded into the ordered structure using a mold as shown in FIGS. 2-6. The structure was molded using a Airburg Allrounder 420S injection molding machine and a Regoplas 150S mold temperature control unit using the following parameters:

| | |
|---|---|
| Melt temperature (° C.) | 193 |
| Tool temperature (° C.) | 132 |
| Injection speed (cm³/sec) | 25 |
| Packing pressure (bar) | 1200 |
| Hold time (s) | 2 |
| Cooling time (s) | 18 |

The molded structure was then debound and sintered to form a dense and rigid structure. The molded samples first debind at 110° C. in $HNO_3$ to ensure the extraction of the acetal base polymer of alloy 316. The debound samples were then sintered by heating to 600° C. with a heating rate of 5° C./min, holding for an hour at this temperature followed by heating to 1380° C. with a heating rate of 5° C./min, and holding at this temperature for three hours in hydrogen.

The openings of the sintered structure were about 300 μm by 400 μm. The struts were fully dense. If less dense struts are required, lower sintering temperature could be used.

Example 8

A structure is made as disclosed in Example 7, except that a Co—Cr alloy is used to form the structure instead of the stainless steel alloy.

Example 9

The structure of example 8 is formed as in example 8. The structure is then shaped for use as an implant. The spaces in the structure are used as channels for bone growth.

Example 10

A mold-based forming process was used to form a polymer structure. CAPA 6500 polycaprolactone supplied by Solvay was molded into ordered porous structures using the mold shown above in FIG. 2. Polycaprolactone is a high molecular weight polyester which has biodergradable properties. The structure was molded on a Nissei injection molding machine under the following conditions:

| | |
|---|---|
| Melt Temperature (° C.) | 60 |
| Tool Temperature (° C.) | 23 |
| Injection Speed (cm³/sec) | 5.16 |
| Packing Pressure (bar) | 21 |
| Hold Time (s) | 12 |
| Cooling Time (s) | 20 |

Example 11

A structure is made as described in Example 10. This structure is used as an implant for use with a tissue and/or bone replacement system. The pores and channels produced though this process are inducive for bone and tissue ingrowth. After molding and sterilization, one or more biologically active coatings can be applied onto the surfaces of the struts of the structure to promote growth and/or degradation.

Example 12

A mold-based forming process was used to form a polymer structure. CAPA 6500 polycaprolactone (PCL) supplied by Solvay was molded into ordered porous structures using the mold shown above in FIG. 2. The PCL material is gravity cast into the mold. The PCL is heated past its melting point of about 58-60° C. to melt the PCL, and is poured into the mold as shown in FIG. 2. The PCL is allowed to solidify, forming the ordered porous structure as shown in FIG. 15.

Example 13

A mold-based forming process was used to form a polymer molded ordered porous structure using polyetheretherketone (PEEK). 406G PEEK supplied by Victrex was molded into ordered porous structures using the mold shown above in FIG. 2. The structure was molded on a Nissei injection molding machine under the following conditions:

| | |
|---|---|
| Melt Temperature (° C.) | 390 |
| Tool Temperature (° C.) | 143 |
| Injection Speed (cm³/sec) | 8.6 |
| Packing Pressure (bar) | 193 |
| Hold Time (s) | 7 |
| Cooling Time (s) | 33 |

Example 14

A molded ordered porous structure is formed as disclosed in Example 13. The surface of the structure is roughened.

Example 15

A molded ordered porous structure is formed as disclosed in Example 13. The structure is then formed into an implant. The structure includes openings which promote living cell growth. In addition, since the openings are also connected internally, the cells would connect to each other internally after penetrating through the surface.

Example 16

An implant is formed through standard techniques and includes surface layers having a molded ordered porous structure as disclosed in Example 13.

Example 17

An implant is made in a mold. The mold includes a solid portion at a center of the mold, and a plurality of pins configured to form a molded ordered porous structure at a surface of the implant.

Example 18

Molded ordered porous structures are formed as in Examples 13, 16, and 17. The internal surfaces within the spaces are coated with one or more materials which are known to promote cell growth and/or cell adhesion.

Example 19

Molded ordered porous structures are formed as in Examples 13, 16, and 17. One or more bioactive (conductive, degradable, inductive, etc.) substances are blended into the PEEK material during molding.

Example 20

Molded ordered porous structures are formed as in Examples 13, 16, and 17. The structure is used in a vertebral body spacer.

Example 21

A mold-based forming process was used to form a polymer molded ordered porous structure using polycarbonate. Lexan brand polycarbonate supplied by General Electric Plastics was molded into ordered porous structures using the mold shown above in FIG. 2. The structure was molded on a Nessei injection molding machine under the following conditions:

| | |
|---|---|
| Melt Temperature (° C.) | 282 |
| Tool Temperature (° C.) | 66 |

|  |  |
|---|---|
| Injection Speed (cm³/sec) | 60 |
| Packing Pressure (bar) | 21 |
| Hold Time (s) | 6 |
| Cooling Time (s) | 22 |

Example 22

A mold-based forming process was used to form a polymer molded ordered porous structure using siloxane. Polymethylenesiloxane type siloxane supplied by Dow Chemical was molded into ordered porous structures using the mold shown above in FIG. 2. The structure was gravity cast under the following conditions:

|  |  |
|---|---|
| Resin/catalyst ratio | (10:1) |
| Mix Time (minutes) | 15 |
| Degas in vacuum (minutes) | 5 |
| Cure Time (hours) | 4 |
| Cure Temperature (° C.) | 22 |

Example 23

A mold-based forming process was used to form a polymer molded ordered porous structure using polyethylene. LM6007-00 polyethylene supplied by Equistar was molded into ordered porous structures using the mold shown above in FIG. 2. The structure was molded on a Nissei injection molding machine under the following conditions:
Equistar LM6007-00 (polyethylene)

|  |  |
|---|---|
| Melt Temperature (° C.) | 184 |
| Tool Temperature (° C.) | 26 |
| Injection Speed (cm³/sec) | 9 |
| Packing Pressure (bar) | 28 |
| Hold Time (s) | 8 |
| Cooling Time (s) | 22 |

Example 24

A mold-based forming process is used to form a polymer molded ordered porous structure using polydimethyl silicone. Polydimethylsilicone supplied by Dow Chemicals is molded into ordered porous structures using the mold shown above in FIG. 2. The structure can be molded on an Arburg injection molding machine.

Example 25

A mold-based forming process was used to form a titanium structure. Catamold Ti brand titanium feedstock supplied by BASF was molded into the ordered structure using a mold as shown in FIGS. 2-6. The structure was formed on an Arburg Allrounder 420S molding machine using the following process conditions:

|  |  |
|---|---|
| Materials feedstock | Pure Titanium Catamold Ti |
| Melt temperature (° C.) | 193 |
| Tool temperature (° C.) | 132 |
| Injection speed (cm³/sec) | 25 |
| Packing pressure (bar) | 1200 |
| Hold time (s) | 2 |
| Cooling time (s) | 18 |

Example 26

For application to an implant, a single structure may be formed in the shape to be implanted. Additional materials may be applied to the structure (e.g. in the spaces of the structure) to aid in the effectiveness of the implant. These additional materials may include drugs, medicine, materials that promote cell growth and/or adhesion, etc.

Example 27

For another application to an implant, multiple structures are formed. The structures are held together within an enclosed portion of a shaped article that is formed in the shape to be implanted. Additionally bio-active materials may be added as discussed in the previous example.

Example 28

For an application to a catalytic converter, a molded ordered porous structure is formed using a ceramic, a stainless steel, or some other material. A washcoat (e.g. made from silica and/or alumina) is then applied to the structure including within the pores. One or more catalysts (e.g. palladium, rhodium, platinum, cerium, iron, nickel, manganese, etc.) are then placed in the structure.

The structure is then placed in an exhaust system between an engine's exhaust outlet (e.g. the exhaust valve) and the outside environment. Sensors (e.g. temperature, oxygen, etc.), which may be connected to a vehicle processing circuit, may be applied in the exhaust system to monitor the functioning of the system.

Example 29

For an application as a heat sink, the molded ordered porous structure is formed from a heat conductive material. The heat conductive material may be electrically conductive or may be electrically non-conductive. The structure is then formed into a heat sink structure.

A heat conductive thermal interface material is applied to the structure whose heat is to be dissipated by the heat sink structure, and the heat sink is placed on top of the thermal interface material such that the thermal interface material is sandwiched between the heat generating item and the heat sink structure. The thermal interface material may be formed from any number of malleable heat conducting materials, preferably in the form of a layer of paste.

A heat transfer fluid (air, water, etc.) may be moved (pumped, blown, etc.) through the spaces/pores of the heat sink structure in order to aid in dissipation of the heat by the heat sink structure.

Example 30

A molded ordered porous structure is formed from a biocompatible material. The structure is used in an orthopedic application as a scaffold for bone replacement.

Example 31

A molded ordered porous structure is formed from a biocompatible material. The structure is used in orthopedic application as a scaffold for tissue engineering.

Example 32

A molded ordered porous structure is formed from a biocompatible material. The structure is used for cell growth.

Example 33

A molded ordered porous structure is formed from an inert material. The structure is used to support the catalyst.

Example 34

A molded ordered porous structure is formed from an inert material. The structure is used in a packed bed reactor.

Example 35

A molded ordered porous structure is used in a filtration application by using the pores for size exclusion.

Example 36

A molded ordered porous structure is used as a filter in a filtration application for filtering molten metal.

Example 37

A molded ordered porous structure is used as a filter in a filtration application for high temperature gas filtration.

Example 38

A molded ordered porous structure is used as a radiant heater. The structure is attached to a heat source and is used to transfer heat into the atmosphere.

Example 39

A molded ordered porous structure is formed from a ceramic material and used as part of a high temperature kiln furniture. The molded ordered porous structure is used to move the structure being fired or sintered in the kiln. The structure is designed to have sufficient porosity to avoid absorbing too much heat and sufficient strength to be able to carry the item being placed into the kiln.

Example 40

A molded ordered porous structure is used in an absorption application. The structure is used as part of a desiccant.

Example 41

A molded ordered porous structure is formed as a ceramic matrix composites (CMC). These structures can be filled with a metal to produce a metal matrix composite. In particular, they may be filled with high temperature performing alloys such as refractory alloys or INCONEL.

Example 42

A molded ordered porous structure is formed as a Metal Matrix composite (MMC). Depending on the design, structures can be developed where the pore volume is more than 50%. In these case, if the pores are filled with a metallic material through squeeze casting for example, then a MMC structure will be obtained.

Example 43

A molded ordered porous structure is formed as a polymer matrix composite (PMC). These materials are formed when the ordered structures are made from metallic or ceramic material and the pores are filled with a polymer.

Example 44

A structural material for buildings and other structures is made using a microporous material made from steel as described above. The structural material may be surround by a concrete shell to form the structure.

Example 45

A structure is made as disclosed in Example 1, except that the final structure is not sintered to full density by sintering at a lower temperature thereby forming microporosity within the struts of the molded ordered porous structure of TCP. These pores can be loaded with active biological agents.

Example 46

A bioresorbable material is used to form a molded ordered porous structure. The bioresorbable portion of the structure is used as a barrier to another material (e.g. drug) contained within the molded ordered porous structure.

Illustrative Embodiments

The following illustrative embodiments are given by way of example and are not intended to limit the scope of the invention claimed below.

One embodiment is directed to a method for forming a porous structure. The method includes injecting a material into a mold to form a molded product, the mold comprising multiple layers of shaping elements extending through a cavity, each layer of shaping elements including multiple shaping elements; and removing the molded product from the mold.

Another embodiment is directed to a method for forming a porous structure. The method includes injecting a material into a mold to form a molded product, the mold comprising multiple layers of shaping elements extending through a cavity, each layer of shaping elements including multiple shaping elements; and removing the molded product from the mold.

Another embodiment is directed to a method for forming a porous structure. The method comprises injecting a material into a mold to form a molded product, the mold comprising at least 15 pins extending through a 400 cubic millimeter area of the mold; and removing the molded product from the mold.

Another embodiment is directed to a method for forming a porous structure. The method comprises injecting a material into a mold to form a molded product, the mold comprising a plurality of shaping elements, the mold configured to provide a porous molded product that is porous in three dimensions; and removing the molded product from the mold.

Another embodiment is directed to a method for forming a porous structure. The method comprises injecting a material into a mold to form a molded product, the mold comprising multiple layers of shaping elements extending through a cavity, each shaping element in at least one of the layers being separated from each other shaping element of the layer by a distance of not more than about 3 mm; and removing the molded product from the mold.

Another embodiment is directed to a mold for forming a molded product. The mold comprises a pin carrying element comprising a plurality of pins carried by a first body; a second body having a plurality of spaces configured to receive the plurality of pins; and a third body having a plurality of spaces configured to receive the plurality of pins. The mold is configured such that a pin carried by the pin carrying element can extend through a first space in the second body and a second space in the third body such that the first space and the second space are separated by a cavity of the mold.

Another embodiment is directed to a mold for forming a molded product. The mold comprises a first pin carrying element comprising a first plurality of pins carried by a first body; a second pin carrying element comprising a second plurality of pins carried by a second body; and a third body having a plurality of spaces configured to receive the plurality of pins. The mold is configured such that a first pin of the first plurality of pins can extend through a first space in the third body at a first angle and a second pin of the second plurality of pins can extend through a second space in the third body at a second angle that is different than the first angle; and the mold is configured such that the first pin and the second pin cross and contact each other in a cavity of the mold.

Another embodiment is directed to a porous structure comprising a plurality of structural members defining the porous structure having pores in three dimensions, the structural members having a shape that includes at least four sides. The shape may include at least 6 or at least 8 sides. The width of the shape from a first side to a second side may not be uniform. The first side of the shape may be smaller than a second side of the shape opposite the first side. The shape may be a parallelogram.

Another embodiment is directed to a mold for forming a molded product comprising multiple layers of overlapping pins, each layer of the multiple layers of overlapping pins located at an angle relative to the layers of pins above and below that layer of pins.

Another embodiment is directed to a mold for forming a molded product comprising multiple layers of overlapping pins, each layer of the multiple layers of overlapping pins located at an angle relative to the layers of pins above and below that layer of pins.

Another embodiment is directed to a mold for forming a molded product. The mold comprises a first pin carrying element comprising a first plurality of layers of pins carried by a first body; and a second pin carrying element comprising a second plurality of layers of pins carried by a second body. The mold is configured such that the first plurality of layers of pins and the second plurality of layers of pins are interlaced and pins of the first plurality of layers of pins contact pins from the second plurality of layers of pins.

Another embodiment is directed to a method for forming a porous structure. The method comprises injecting a material into a mold to form a molded product comprising a ceramic lattice; and removing the molded product from the mold.

Another embodiment is directed to a structure comprising a lattice of struts defining spaces having passages between intersections of the spaces, where the lattice comprises spaces that pass straight through the structure from a first side of the structure to a second side of the structure; and where more than 70% of the passages of the spaces have an average cross-sectional area of about 2500 square microns to about 1 square centimeter.

Other embodiments are directed to a method or product according to one of the above-mentioned embodiments, wherein the molded ordered porous structure is used in an application. These embodiments include an implant that comprises a molded ordered porous structure, a heat transfer device comprises a molded ordered porous structure, a system that comprises a molded ordered porous structure having cells located within the pores, a filtration system that comprises a molded ordered porous structure, an electronic device having a processor and a heat dissipating structure coupled to the processor where the heat dissipating structure comprises a molded ordered porous structure, or any other application discussed above.

In some embodiments the mold may be configured such that multiple pins of each layer of pins at least extend through a portion of the mold having a volume of up to 10 cubic centimeters, up to 1 cubic centimeter, up to 10,000 cubic millimeters, up to 1000 cubic millimeters, up to 500 cubic millimeters, up to 100 cubic millimeters, up to 50 cubic millimeters, up to 10 cubic millimeters, up to 5 cubic millimeters, up to 1 cubic millimeter, and/or over 10 cubic millimeters.

If shaping elements (e.g. pins) are referenced below as extending through at least a particular volume, the portion of the mold by which the volume is judged may be a space defined by walls of the mold (e.g. walls of pin carrying members, an L member, end members, etc.), the portion may only be part (e.g. subset) of such a space (e.g. where the portion is smaller than the total space defined by such mold walls), or may be some other portion having a defined, regular shape. Each of the pins may extend fully within this volume, may extend only partially within the volume, may only have a small portion of the pin which extends in the volume, etc. The total volume defined by the pins may be larger than the volume of the mold through which the pins are said to at least extend.

Any of these illustrative embodiments may include one or more of the features discussed in more detail above.

What is claimed is:
1. A mold for forming a molded product, comprising:
a first pin carrying element comprising a first plurality of layers of pins carried by a first body; and
a second pin carrying element comprising a second plurality of layers of pins carried by a second body;
wherein the mold is configured such that the first plurality of layers of pins and the second plurality of layers of pins are interlaced and pins of the first plurality of layers of pins contact pins from the second plurality of layers of pins;
first plurality of layers of pins and the second plurality of layers of pins have at least 100 points of contact within an area of up to 1000 cubic millimeters.

2. The mold of claim 1, wherein substantially all of the pins in the first plurality of pins have a cross-sectional diameter less than about 500 microns.

3. The mold of claim 1, wherein substantially all of the pins in the first plurality of pins have a length of less than about 125 mm.

4. The mold of claim 1, wherein each layer of the first plurality of layers of pins and the second plurality of layers of pins includes multiple pins.

5. The mold of claim 1, wherein the mold is configured such that multiple pins of each layer of the first plurality of layers of pins and the second plurality of layers of pins at least extend through a volume of the mold having a volume of up to 10 cubic centimeters.

6. The mold of claim 1, wherein the mold comprises multiple layers of shaping elements extending through a cavity, each layer of shaping elements including multiple shaping elements; and
the multiple layers of shaping elements include layers of shaping elements that extend in at least two directions; and the shaping elements have at least 100 points of contact within an area of up to 1000 cubic millimeters.

7. The mold of claim 6, wherein each of the layers of shaping elements of the multiple layers of shaping elements is configured to at least extend through a portion of the mold having a volume of up to about 400 cubic millimeters.

8. The mold of claim 6, wherein the mold further comprises a plurality of additional layers of pins extending in the same direction as the multiple layers of shaping elements.

9. The mold of claim 6, wherein substantially all of the shaping elements of the multiple layers of shaping elements have an average cross-sectional diameter less than about 1 millimeter.

10. The mold of claim 6, wherein substantially all of the shaping elements of the multiple layers of shaping elements have an average cross-sectional diameter less than about 100 microns.

11. The mold of claim 1, wherein a molded product formed by injection of a material into the mold has a porous structure, which comprises a multiplicity of ordered structural members defining the porous structure having pores that extend in three dimensions, the multiplicity of structural members intersecting to form structural member intersections, substantially all of the structural member intersections being essentially fluid, and a multiplicity of the pores defined by the multiplicity of structural members substantially extending in a natural direction.

12. The mold of claim 11, wherein the multiplicity of structural members comprise at least about 100 points of contact within an area of up to about 400 cubic millimeters.

13. The mold of claim 11, wherein the multiplicity of the pores defined by the multiplicity of structural members that substantially extend in a natural direction comprise pores extending in a plurality of different natural directions.

14. The mold of claim 11, wherein substantially all of pores the multiplicity of structural members have substantially a same shape.

15. The mold of claim 11, wherein substantially all of the pores defined by the multiplicity of structural members extend straight.

16. The mold of claim 11, wherein a multiplicity of the pores defined by the multiplicity of structural members are at least partially tapered.

17. The mold of claim 11, wherein substantially all of the pores defined by the multiplicity of structural members are about a same size.

18. The mold of claim 11, wherein the porous structure comprises pores that are essentially interconnected with each other.

19. The mold of claim 11, wherein the multiple layers of structural members include layers of structural members that extend in at least two directions; and the structural members have at least 100 points of contact within an area of up to 400 cubic millimeters.

20. The mold of claim 11, wherein substantially all of the pores have a cross-sectional diameter less than about 500 microns.

21. The mold of claim 11, wherein the multiplicity of structural members comprise at least about 100 points of contact within an area of up to about 400 cubic millimeters; and substantially all of the pores have a cross-sectional diameter less than about 100 microns.

* * * * *